US012680638B2

(12) United States Patent
Larson

(10) Patent No.: US 12,680,638 B2
(45) Date of Patent: ***Jul. 14, 2026

(54) GUIDE RING

(71) Applicant: Mueller International, LLC, Atlanta, GA (US)

(72) Inventor: Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/930,432

(22) Filed: Oct. 29, 2024

(65) Prior Publication Data

US 2025/0052349 A1 Feb. 13, 2025

Related U.S. Application Data

(60) Division of application No. 18/235,301, filed on Aug. 17, 2023, now Pat. No. 12,565,954, which is a
(Continued)

(51) Int. Cl.
*F16L 37/091* (2006.01)
*F16L 19/04* (2006.01)
(Continued)

(52) U.S. Cl.
CPC .............. *F16L 37/091* (2013.01); *F16L 19/04* (2013.01); *F16L 19/061* (2013.01); *F16L 19/065* (2013.01); *F16L 47/041* (2019.08)

(58) Field of Classification Search
CPC ......... F16L 17/02; F16L 17/032; F16L 17/08; F16L 19/10; F16L 19/08; F16L 19/12;
(Continued)

(56) References Cited

U.S. PATENT DOCUMENTS

| | | | |
|---|---|---|---|
| 66,820 | A | 7/1867 | Fitts |
| 997,351 | A | 7/1911 | Williams |
| | | (Continued) | |

FOREIGN PATENT DOCUMENTS

| | | |
|---|---|---|
| CA | 2867172 | 9/2013 |
| CA | 2881822 | 12/2013 |
| | (Continued) | |

OTHER PUBLICATIONS

Larson, Ryan Fairchild; Advisory Action for U.S. Appl. No. 18/235,301, filed Aug. 17, 2023, mailed Mar. 4, 2025, 3 pgs.
(Continued)

*Primary Examiner* — William S. Choi
(74) *Attorney, Agent, or Firm* — Smith, Gambrell & Russell, LLP

(57) ABSTRACT

A guide ring includes a guide ring body defining a guide outer surface, a guide inner surface opposite the guide outer surface, a first lateral end, a second lateral end opposite the first lateral end, a first circumferential end, and a second circumferential end opposite the first circumferential end, the guide inner surface defining a guide ring opening; a gap defined between the first circumferential end and the second circumferential end; and an arcuate guide slot extending laterally into the guide ring body and disposed radially between the guide outer surface and the guide inner surface and configured to receive a grip ring; wherein the guide ring body is configured to be compressed radially inward to reduce a width of the gap between the first circumferential end and the second circumferential end.

6 Claims, 16 Drawing Sheets

Related U.S. Application Data continuation of application No. 17/475,425, filed on Sep. 15, 2021, now Pat. No. 11,774,022, which is a continuation-in-part of application No. 17/110,827, filed on Dec. 3, 2020, now Pat. No. 11,754,208.

(51) Int. Cl.
| | |
|---|---|
| *F16L 19/06* | (2006.01) |
| *F16L 19/065* | (2006.01) |
| *F16L 47/04* | (2006.01) |

(58) Field of Classification Search
CPC ....... F16L 19/04; F16L 19/061; F16L 19/065; F16L 37/091; F16L 37/092; F16L 37/0925; F16L 47/041
USPC ........................................................ 285/339
See application file for complete search history.

(56) References Cited

U.S. PATENT DOCUMENTS

| | | | |
|---|---|---|---|
| 1,822,056 A | | 9/1931 | Noble |
| 2,187,217 A | | 1/1940 | Winslow |
| 2,201,372 A | | 5/1940 | Miller |
| 2,245,154 A | | 6/1941 | Mcwane |
| 2,358,408 A | | 9/1944 | Mcmurray |
| 2,374,138 A | | 4/1945 | Sanford |
| 2,405,822 A | | 8/1946 | Franck |
| 2,466,526 A | | 4/1949 | Wolfram |
| 2,490,620 A | | 12/1949 | Cole et al. |
| 2,529,552 A | | 11/1950 | Herold |
| 2,547,394 A | * | 4/1951 | Hynes |
| 2,585,453 A | | 2/1952 | Gallagher et al. |
| 2,672,187 A | * | 3/1954 | Smith |
| 2,755,111 A | | 7/1956 | Newell et al. |
| 2,779,610 A | | 1/1957 | Risley |
| 2,786,697 A | | 3/1957 | Rescheneder |
| 2,787,479 A | | 4/1957 | Burns |
| 2,831,711 A | | 4/1958 | Leadbetter |
| 2,837,351 A | | 6/1958 | Bailey |
| 2,907,589 A | | 10/1959 | Knox |
| 2,999,701 A | | 9/1961 | Blair et al. |
| 3,100,656 A | | 8/1963 | Macarthur |
| 3,204,988 A | | 9/1965 | Ouderkirk et al. |
| 3,233,926 A | | 2/1966 | Walterscheid-Muller |
| 3,389,923 A | | 6/1968 | Love, Jr. et al. |
| 3,441,297 A | | 4/1969 | Koski |
| 3,489,441 A | | 1/1970 | Malcolm |
| 3,545,794 A | | 12/1970 | Wise et al. |
| 3,811,710 A | | 5/1974 | Dula et al. |
| 3,815,940 A | | 6/1974 | Luckenbill |
| 3,848,905 A | | 11/1974 | Hammer et al. |
| 3,874,709 A | * | 4/1975 | MacDonald .......... F16L 37/091 |
| 3,915,478 A | | 10/1975 | Al et al. |
| 3,924,877 A | * | 12/1975 | Leopold, Jr. .......... F16L 37/091 |
| 3,924,882 A | | 12/1975 | Ellis |
| 3,944,265 A | | 3/1976 | Hiemstra et al. |
| 3,995,655 A | | 12/1976 | Sands |
| 4,054,305 A | | 10/1977 | Gajajiva et al. |
| 4,059,297 A | | 11/1977 | Grahl et al. |
| 4,073,513 A | | 2/1978 | Blakeley |
| 4,082,326 A | | 4/1978 | Bryson |
| 4,119,333 A | | 10/1978 | Straub |
| 4,296,954 A | | 10/1981 | Fujimaki et al. |
| 4,537,406 A | | 8/1985 | Hirasuna et al. |
| 4,676,530 A | | 6/1987 | Nordgren et al. |
| 4,856,828 A | | 8/1989 | Kessler et al. |
| 4,875,713 A | | 10/1989 | Carstensen |
| 4,878,697 A | | 11/1989 | Henry |
| 4,960,546 A | | 10/1990 | Tharp |
| 5,000,489 A | | 3/1991 | Burke |
| 5,056,831 A | | 10/1991 | Ho |
| 5,149,144 A | | 9/1992 | Blakeley |
| 5,160,179 A | | 11/1992 | Takagi |
| 5,351,998 A | | 10/1994 | Behrens et al. |
| 5,487,572 A | | 1/1996 | Combot-Courrau et al. |
| 5,496,076 A | | 3/1996 | Lin |
| 5,553,901 A | | 9/1996 | Serot |
| 5,692,784 A | | 12/1997 | Hama et al. |
| 5,692,785 A | | 12/1997 | Wartluft et al. |
| 5,695,224 A | | 12/1997 | Grenier |
| 5,730,476 A | | 3/1998 | Gouda |
| 6,264,250 B1 | | 7/2001 | Teraoka et al. |
| 6,642,451 B1 | | 11/2003 | Gretz |
| 6,824,172 B1 | | 11/2004 | Komolrochanaporn |
| 6,835,088 B2 | | 12/2004 | Shemtov |
| 6,913,292 B2 | | 7/2005 | Snyder, Sr. et al. |
| 7,080,859 B1 | | 7/2006 | Gretz et al. |
| 7,331,615 B2 | | 2/2008 | Cheytanov |
| 7,396,053 B2 | | 7/2008 | Webb et al. |
| 7,621,569 B2 | | 11/2009 | Anthoine |
| 8,038,180 B2 | | 10/2011 | Williams et al. |
| 8,042,234 B2 | | 10/2011 | Rigollet et al. |
| 8,303,001 B2 | | 11/2012 | Oh |
| 8,322,755 B2 | | 12/2012 | Kluss et al. |
| 8,398,122 B2 | | 3/2013 | Crompton et al. |
| 8,528,944 B2 | | 9/2013 | Lee |
| 8,528,945 B2 | | 9/2013 | Bird et al. |
| 8,776,351 B2 | | 7/2014 | Bird et al. |
| 8,789,832 B2 | | 7/2014 | Gabert |
| 8,894,100 B2 | | 11/2014 | Eaton et al. |
| 9,168,585 B2 | | 10/2015 | Schell et al. |
| 9,217,529 B2 | | 12/2015 | Crompton et al. |
| 9,366,368 B2 | | 6/2016 | Hausl |
| 9,534,714 B2 | | 1/2017 | Eaton et al. |
| 9,599,266 B2 | | 3/2017 | Schreckenberg et al. |
| 9,611,961 B2 | | 4/2017 | Bennett et al. |
| 9,689,517 B2 | | 6/2017 | Petersen et al. |
| 9,746,114 B2 | | 8/2017 | Le Quere |
| 9,791,078 B2 | | 10/2017 | Lee |
| 9,851,028 B2 | | 12/2017 | Stout et al. |
| 9,879,810 B2 | | 1/2018 | Crompton et al. |
| 9,903,516 B2 | | 2/2018 | Salehi-Bakhtiari et al. |
| 9,915,385 B2 | | 3/2018 | Eaton et al. |
| 10,578,234 B2 | | 3/2020 | Bowman |
| 10,711,929 B1 | | 7/2020 | Lu |
| 11,015,748 B2 | | 5/2021 | Larson et al. |
| 11,635,159 B2 | | 4/2023 | Larson et al. |
| 11,754,208 B2 | | 9/2023 | Larson |
| 11,774,022 B2 | | 10/2023 | Larson |
| 12,078,267 B2 | | 9/2024 | Larson et al. |
| 12,085,198 B2 | | 9/2024 | Larson |
| 12,449,071 B2 | | 10/2025 | Larson |
| 12,565,954 B2 | | 3/2026 | Larson |
| 2001/0047572 A1 | | 12/2001 | Cassel et al. |
| 2003/0015872 A1 | | 1/2003 | Potts et al. |
| 2003/0132632 A1 | | 7/2003 | Schoonen |
| 2004/0068847 A1 | | 4/2004 | Belisle et al. |
| 2004/0090067 A1 | | 5/2004 | Pridham |
| 2004/0261227 A1 | | 12/2004 | Cassel et al. |
| 2005/0084327 A1 | | 4/2005 | Chelchowski et al. |
| 2006/0175837 A1 | | 8/2006 | Ignaczak et al. |
| 2007/0075542 A1 | | 4/2007 | Glaze et al. |
| 2009/0001712 A1 | | 1/2009 | Webb et al. |
| 2009/0021001 A1 | | 1/2009 | Oh |
| 2009/0051126 A1 | | 2/2009 | King, Jr. et al. |
| 2009/0302601 A1 | | 12/2009 | Sarkisyan et al. |
| 2010/0001519 A1 | | 1/2010 | Komolrochanaporn |
| 2010/0181759 A1 | | 7/2010 | Quinn et al. |
| 2011/0156383 A1 | | 6/2011 | Bobst |
| 2011/0240143 A1 | | 10/2011 | Lang et al. |
| 2012/0256415 A1 | | 10/2012 | Dole |
| 2014/0042742 A1 | | 2/2014 | Pang |
| 2014/0306449 A1 | | 10/2014 | Prevot et al. |
| 2014/0327238 A1 | | 11/2014 | Bowman |
| 2015/0159794 A1 | | 6/2015 | Bobo et al. |
| 2015/0233506 A1 | | 8/2015 | Kim |
| 2016/0223104 A1 | | 8/2016 | Webb et al. |
| 2016/0298400 A1 | | 10/2016 | Sabatier |
| 2016/0319967 A1 | | 11/2016 | Yoo |
| 2017/0097024 A1 | | 4/2017 | Drivon et al. |
| 2017/0328500 A1 | | 11/2017 | Bowman et al. |
| 2018/0283586 A1 | | 10/2018 | Larson et al. |
| 2020/0025316 A1 | | 1/2020 | Chiproot |

(56)        References Cited

U.S. PATENT DOCUMENTS

| 2020/0103062 A1 | 4/2020 | Belen |
| 2020/0347967 A1 | 11/2020 | Rigollet et al. |
| 2020/0347968 A1 | 11/2020 | Clerc et al. |
| 2021/0148494 A1 | 5/2021 | Fleck et al. |
| 2021/0262595 A1 | 8/2021 | Zhang et al. |
| 2022/0145924 A1 | 5/2022 | Bowman et al. |
| 2022/0178475 A1 | 6/2022 | Larson |
| 2022/0178479 A1 | 6/2022 | Larson |
| 2022/0260188 A1 | 8/2022 | Bowman et al. |
| 2022/0341519 A1 | 10/2022 | Larson |
| 2022/0341520 A1 | 10/2022 | Larson |
| 2023/0383876 A1 | 11/2023 | Larson |
| 2023/0392731 A1 | 12/2023 | Larson |
| 2024/0344642 A1 | 10/2024 | Larson et al. |
| 2024/0392901 A1 | 11/2024 | Larson |
| 2026/0018807 A1 | 1/2026 | Larson |

FOREIGN PATENT DOCUMENTS

| CA | 2999727 A1 | 3/2018 |
| DE | 3728898 A | 3/1989 |
| DE | 4403702 | 2/1995 |
| DE | 19800050 | 7/1998 |
| DE | 202004015506 | 3/2006 |
| DE | 202006005082 | 7/2006 |
| EP | 528079 | 2/1993 |
| EP | 1930642 A2 | 6/2008 |
| EP | 3425253 | 1/2019 |
| FR | 866147 | 6/1941 |
| FR | 2515277 A1 | 4/1983 |
| FR | 3010762 A1 | 3/2015 |
| GB | 760290 | 10/1956 |
| GB | 2389395 | 12/2003 |
| GB | 2518220 | 3/2015 |
| GB | 2559412 | 8/2018 |
| GB | 2584267 A | 12/2020 |
| JP | 2010084880 | 4/2010 |
| KR | 2003091904 | 12/2003 |
| KR | 200443803 | 3/2009 |
| KR | 20130052967 | 5/2013 |
| KR | 101501704 B1 | 3/2015 |
| WO | 8002317 A1 | 10/1980 |
| WO | 0077436 | 12/2000 |
| WO | 2005017402 | 2/2005 |
| WO | 2006055966 | 5/2006 |
| WO | 2008097914 A1 | 8/2008 |
| WO | 2013153323 | 10/2013 |
| WO | 2020045749 A1 | 3/2020 |
| WO | 2023043568 | 3/2023 |

OTHER PUBLICATIONS

Larson, Ryan Fairchild; Final Office Action for U.S. Appl. No. 18/235,301, filed Aug. 17, 2023, mailed Feb. 4, 2025, 24 pgs.
Larson, Ryan Fairchild; Non-Final Office Action for U.S. Appl. No. 18/235,301, filed Aug. 17, 2023, mailed Apr. 7, 2025, 17 pgs.
Larson, Ryan Fairchild; Advisory Action for U.S. Appl. No. 17/236,365, filed Apr. 21, 2021, mailed Jan. 22, 2025, 3 pgs.
Larson, Ryan Fairchild; Final Office Action for U.S. Appl. No. 18/201,544, filed May 24, 2023, mailed Apr. 3, 2025, 17 pgs.
Larson, Ryan Fairchild; Extended European Search Report for European Patent Application No. 22870486.2, filed Aug. 18, 2022, mailed Apr. 10, 2025, 12 pgs.
Larson, Ryan Fairchild; Partial European Search Report for European Patent Application No. 22870486.2, filed Aug. 18, 2022, mailed Mar. 11, 2025, 13 pgs.
Cambridge Bass; Article entitled: "Cambridge Coupling", located at <https://www.cambridgebrass.com/uploaded_files/CambridgeCouplingBrochure2013lr.pdf>, copyright 2013, 4 pgs.
HARCO; Article entitled: "Philmac UTC How It Works", located at <http://www.harcofittings.com/Products/Philmac/UTC/utc_010.htm>, copyright 2013, accessed on Mar. 3, 2021, 1 pg.

Larson, Ryan Fairchild; Final Office Action for U.S. Appl. No. 17/110,827, filed Dec. 3, 2020, mailed Mar. 22, 2023, 29 pgs.
Larson, Ryan Fairchild; Final Office Action for U.S. Appl. No. 17/110,827, filed Dec. 3, 2020, mailed Jul. 29, 2022, 19 pgs.
Larson, Ryan Fairchild; Non-Final Office Action for U.S. Appl. No. 17/110,827, filed Dec. 3, 2020, mailed Nov. 8, 2022, 33 pgs.
Larson, Ryan Fairchild; Non-Final Office Action for U.S. Appl. No. 17/110,827, filed Dec. 3, 2020, mailed Apr. 13, 2022, 43 pgs.
Larson, Ryan Fairchild; Notice of Allowance for U.S. Appl. No. 17/110,827, filed Dec. 3, 2020, mailed Jul. 12, 2023, 11 pgs.
Larson, Ryan Fairchild; Non-Final Office Action for U.S. Appl. No. 17/475,425, filed Sep. 15, 2021, mailed Jan. 18, 2023, 36 pgs.
Larson, Ryan Fairchild; Notice of Allowance for U.S. Appl. No. 17/475,425, filed Sep. 15, 2021, mailed May 30, 2023, 10 pgs.
Larson, Ryan Fairchild; Non-Final Office Action for U.S. Appl. No. 18/235,301, filed Aug. 17, 2023, mailed Nov. 13, 2024, 49 pgs.
Larson, Ryan Fairchild; Requirement for Restriction/Election for U.S. Appl. No. 18/235,301, filed Aug. 17, 2023, mailed Aug. 28, 2024, 6 pgs.
Screen capture from YouTube video clip entitled "Size Notches for Easy Identification of Pieces" 1 page, uploaded on Jul. 20, 2020 by user "StyleCAD". Retrieved from Internet: < https://www.youtube.com/watch?v=4-Klj5dcF60>. (Year: 2020).
HARCO; Article entitled: "Philmac 3G Cts How It Works", located at <http://www.harcofittings.com/Products/Philmac/3G/CTS/cts_020.htm>, publicly available prior to Mar. 23, 2021, 1 pg.
Larson, Ryan Fairchild; Applicant-Initiated Interview Summary for U.S. Appl. No. 17/236,365, filed Apr. 21, 2021, mailed Aug. 22, 2023, 2 pgs.
Larson, Ryan Fairchild; Final Office Action for U.S. Appl. No. 17/236,365, filed Apr. 21, 2021, mailed Dec. 13, 2023, 39 pgs.
Larson, Ryan Fairchild; Final Office Action for U.S. Appl. No. 17/236,365, filed Apr. 21, 2021, mailed Sep. 28, 2024, 35 pgs.
Larson, Ryan Fairchild; Non-Final Office Action for U.S. Appl. No. 17/236,365, filed Apr. 21, 2021, mailed May 26, 2023, 37 pgs.
Larson, Ryan Fairchild; Non-Final Office Action U.S. Appl. No. 17/236,365, filed Apr. 21, 2021, mailed Mar. 21, 2024, 20 pgs.
Larson, Ryan Fairchild; Non-Final Office Action for U.S. Appl. No. 18/201,544, filed May 24, 2023, mailed Sep. 29, 2024, 36 pgs.
Larson, Ryan Fairchild; Requirement for Restriction/Election for U.S. Appl. No. 18/201,544, filed May 24, 2023, mailed Jul. 3, 2024, 6 pgs.
Larson, Ryan Fairchild; International Preliminary Report on Patentability for PCT Application No. PCT/US22/40780, filed Aug. 18, 2022, mailed Mar. 28, 2024, 7 pgs.
Larson, Ryan Fairchild; International Search Report and Written Opinion for PCT Application No. PCT/US22/40780, filed Aug. 18, 2022, mailed Nov. 15, 2022, 8 pgs.
Brochure for Top Bolt Couplings, publicly available prior to May 22, 2022, 2 pgs.
Google search for "pack joint", publicly available prior to May 25, 2022, 2 pgs.
Krausz; Brochure for Hymax Grip, located at <https://krausz.com/wp-content/uploads/2019/09/BR0037_C_GRIP_40-300_LOW.pdf>, available on the Wayback Machine as early as Dec. 5, 2020, 5 pgs.
Krausz; Brochure for HYMAX, located at <https://krausz.com/wp-content/uploads/2019/11/BR0036_F_HYMAX_40-1500_LOW.pdf>, available as early as May 22, 2022, 4 pgs.
Romac Industries; Article entitled: "Alpha Restrained Coupling", located at <ttps://romac.com/alpha-coupling>, available on the Wayback Machine as early as Mar. 4, 2018, 6 pgs.
Victaulic; Article entitled: "Victaulic QuickVic™ Style 107V Rigid Coupling", located at <https://www.victaulic.com/products/style-107v-quickvic-rigid-coupling/>, available on the Wayback Machine as early as Feb. 11, 2022, 2 pgs.
Conex Banninger; Article entitled: "The Grip Ring", located at <https://www.conexbanninger.com.au/why-conex/the-grip-ring/>, available on the Wayback Machine as early as Mar. 6, 2019, 3 pgs.
Larson, Ryan Fairchild; Final Office Action for U.S. Appl. No. 18/235,301, filed Aug. 17, 2023, mailed Jul. 30, 2025, 16 pgs.
Larson, Ryan Fairchild; Non-Final Office Action for U.S. Appl. No. 17/236,365, filed Apr. 21, 2021, mailed Jun. 6, 2025, 45 pgs.

(56) References Cited

OTHER PUBLICATIONS

Larson, Ryan Fairchild; Notice of Allowance for U.S. Appl. No. 18/201,544, filed May 24, 2023, mailed Jul. 7, 2025, 18 pgs.

Larson, Ryan Fairchild; Requirement for Restriction/Election for U.S. Appl. No. 18/752,271, filed Jun. 24, 2024, mailed May 29, 2025, 6 pgs.

Larson, Ryan Fairchild; Notice of Allowance for U.S. Appl. No. 18/235,301, filed Aug. 17, 2023, mailed Oct. 29, 2025, 18 pgs.

Larson, Ryan Fairchild; Applicant-Initiated Interview Summary for U.S. Appl. No. 17/236,365, filed Apr. 21, 2021, mailed Sep. 10, 2025, 3 pgs.

Larson, Ryan Fairchild; Non-Final Office Action for U.S. Appl. No. 17/236,365, filed Apr. 21, 2021, mailed Oct. 17, 2025, 31 pgs.

Larson, Ryan Fairchild; Applicant-Initiated Interview Summary for U.S. Appl. No. 17/236,192, filed Apr. 21, 2021, mailed Jan. 9, 2023, 2 pgs.

Larson, Ryan Fairchild; Final Office Action for U.S. Appl. No. 17/236,192, filed Apr. 21, 2021, mailed Nov. 1, 2022, 14 pgs.

Larson, Ryan Fairchild; Final Office Action for U.S. Appl. No. 17/236,192, filed Apr. 21, 2021, mailed Apr. 1, 2024, 6 pgs.

Larson, Ryan Fairchild; Final Office Action for U.S. Appl. No. 17/236,192, filed Apr. 21, 2021, mailed Sep. 7, 2023, 12 pgs.

Larson, Ryan Fairchild; Non-Final Office Action for U.S. Appl. No. 17/236,192 filed Apr. 21, 2021, mailed Dec. 4, 2023, 14 pgs.

Larson, Ryan Fairchild; Non-Final Office Action for U.S. Appl. No. 17/236,192, filed Apr. 21, 2021, mailed Apr. 13, 2023, 13 pgs.

Larson, Ryan Fairchild; Non-Final Office Action for U.S. Appl. No. 17/236,192, filed Apr. 21, 2021, mailed May 9, 2022, 15 pgs.

Larson, Ryan Fairchild; Notice of Allowance for U.S. Appl. No. 17/236,192, filed Apr. 21, 2021, mailed May 15, 2024, 6 pgs.

Larson, Ryan Fairchild; Final Office Action for U.S. Appl. No. 18/790,205, filed Jul. 31, 2024, mailed Nov. 24, 2025, 13 pgs.

Larson, Ryan Fairchild; Non-Final Office Action for U.S. Appl. No. 18/790,205, filed Jul. 31, 2024, mailed May 30, 2025, 18 pgs.

Larson, Ryan Fairchild; Non-Final Office Action for U.S. Appl. No. 18/752,271, filed Jun. 24, 2024, mailed Sep. 24, 2025, 54 pgs.

Larson, Ryan Fairchild; Final Office Action for U.S. Appl. No. 18/752,271, filed Jun. 24, 2024, mailed Jan. 21, 2026, 23 pgs.

Larson, Ryan Fairchild; Non-Final Office Action for U.S. Appl. No. 18/790,205, filed Jul. 31, 2024, mailed Apr. 7, 2026, 37 pgs.

Larson, Ryan Fairchild; Non-Final Office Action for U.S. Appl. No. 18/752,271, filed Jun. 24, 2024, mailed May 5, 2026, 17 pgs.

* cited by examiner

GUIDE RING

CROSS-REFERENCE TO RELATED APPLICATIONS

The present application is a divisional application of U.S. application Ser. No. 18/235,301, filed Aug. 24, 2023, which is a continuation of U.S. application Ser. No. 17/475,425, filed Sep. 15, 2021, which issued as U.S. Pat. No. 11,774, 022 on Sep. 13, 2023, which is a continuation-in-part of U.S. application Ser. No. 17/110,827, filed Dec. 3, 2020, which issued as U.S. Pat. No. 11,754,208 on Aug. 23, 2023, each of which is hereby specifically incorporated by reference herein in its entirety.

TECHNICAL FIELD

This disclosure relates to piping systems. More specifically, this disclosure relates to push-type pipe fittings.

BACKGROUND

Pipe fittings are often provided for connecting two or more piping components (e.g., pipes, tubes, fittings, etc.). Push-type fittings are a type of fitting wherein a first piping component, such as pipe, can be connected to the fitting simply by pushing the pipe into a channel of the fitting. Typically, a seal, such as an O-ring, is provided within the channel and is configured to create a fluid-tight seal with the pipe. However, the seal often twists or rotates within the fitting, and the pipe can push the seal through the fitting, instead of extending through the stationary seal as intended. It is often also required that a user bevels the pipe prior to inserting the pipe into the channel, in order to smooth an outer surface of the pipe and minimize damage to the seal. Often a grip ring is also received within the channel and can be configured to bite into the pipe. However, grip rings are typically formed from a plastic material, which is limited in its strength and can only grip specific materials. For example, a plastic grip ring is suitable for gripping a plastic pipe or tubing, but is not suitable for gripping a metal pipe. Some fittings require an insert stiffener to prevent the grip ring from disengaging the pipe/tubing.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a pipe fitting comprising a fitting body defining an inner surface, an outer surface, a first fitting end, and an second fitting end, the inner surface defining a channel extending from the first fitting end to the second fitting end, a portion of the inner surface defining a tapered region tapering towards the first fitting end; and an engagement assembly comprising a metal grip ring received in the channel, the metal grip ring defining a ring body and a plurality of teeth extending inward from the ring body, the engagement assembly configured to slide along the tapered region.

Also disclosed is a pipe fitting assembly comprising a fitting body defining a first fitting end, a second fitting end, and a channel extending from the first fitting end to the second fitting end; and a gasket disposed in the channel, the gasket defining a gasket first lateral end, a gasket second lateral end, a gasket outer surface, and a gasket inner surface, a plurality of flanges extending substantially radially inward from the gasket inner surface.

Also disclosed is a method for tightening a pipe fitting assembly comprising inserting a pipe into a channel of a pipe fitting in an inward direction, the pipe fitting defining an inner surface, an first fitting end, and an second fitting end, the inner surface defining the channel, the channel extending from the first fitting end to the second fitting end; engaging the pipe with an engagement assembly disposed within the channel; pulling the pipe in an outward direction opposite of the inward direction; and sliding the engagement assembly along a tapered region of the inner surface to increasingly press the engagement assembly into engagement with the pipe.

Additionally, disclosed is a pipe fitting comprising a fitting body defining an inner surface, an outer surface, a first fitting end, and a second fitting end, the inner surface defining a channel extending from the first fitting end to the second fitting end, a portion of the inner surface defining a tapered region tapering towards the first fitting end; and an engagement assembly comprising a metal grip ring received in the channel, the metal grip ring defining a substantially frustoconical ring body, the ring body defining a diameter that tapers from a first lateral end of the ring body to a second lateral end of the ring body, the engagement assembly configured to slide along the tapered region.

Moreover, disclosed is an engagement assembly comprising a grip ring defining a substantially C-shaped ring body, the ring body defining a grip ring first end and a grip ring second end, a retainer tab extending from the grip ring first end; and a substantially C-shaped guide ring defining a guide ring first end, a guide ring second end, and a guide slot, a first portion of the ring body received in the guide slot, a retainer protrusion extending from the guide ring and disposed adjacent to the guide ring first end; wherein the retainer tab engages the retainer protrusion to retain the first portion of the ring body within the guide slot.

A grip ring is disclosed, the grip ring comprising a substantially frustoconical metal ring body defining a diameter that tapers from a first lateral end of the ring body to a second lateral end of the ring body opposite the first lateral end, the ring body further defining a first circumferential end, a second circumferential end opposite the first circumferential end, an inner surface defining a guide ring opening, and an outer surface opposite the inner surface; and a gap defined between the first circumferential end and the second circumferential end; wherein the ring body is configured to be compressed radially inward to reduce a width of the gap between the first circumferential end and the second circumferential end.

Additionally, disclosed is a guide ring comprising a guide ring body defining a guide outer surface, a guide inner surface opposite the guide outer surface, a first lateral end, a second lateral end opposite the first lateral end, a first circumferential end, and a second circumferential end opposite the first circumferential end, the guide inner surface defining a guide ring opening; a gap defined between the first circumferential end and the second circumferential end; and an arcuate guide slot extending laterally into the guide ring body and disposed radially between the guide outer surface and the guide inner surface and configured to receive a grip ring; wherein the guide ring body is configured to be compressed radially inward to reduce a width of the gap between the first circumferential end and the second circumferential end.

A method of assembling an engagement assembly comprising providing a guide ring, the guide ring defining a guide ring first lateral end, a guide ring second lateral end, and a guide slot extending laterally into the guide ring at the guide ring first lateral end; receiving a grip ring first lateral end of a grip ring within the guide slot, wherein the grip ring further defines a grip ring second lateral end opposite the grip ring first lateral end, the grip ring further lateral end defining a distal engagement edge configured to grip a pipe; and engaging a retainer tab of the grip ring with a retainer protrusion of the guide ring to retain the grip ring within the guide slot.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
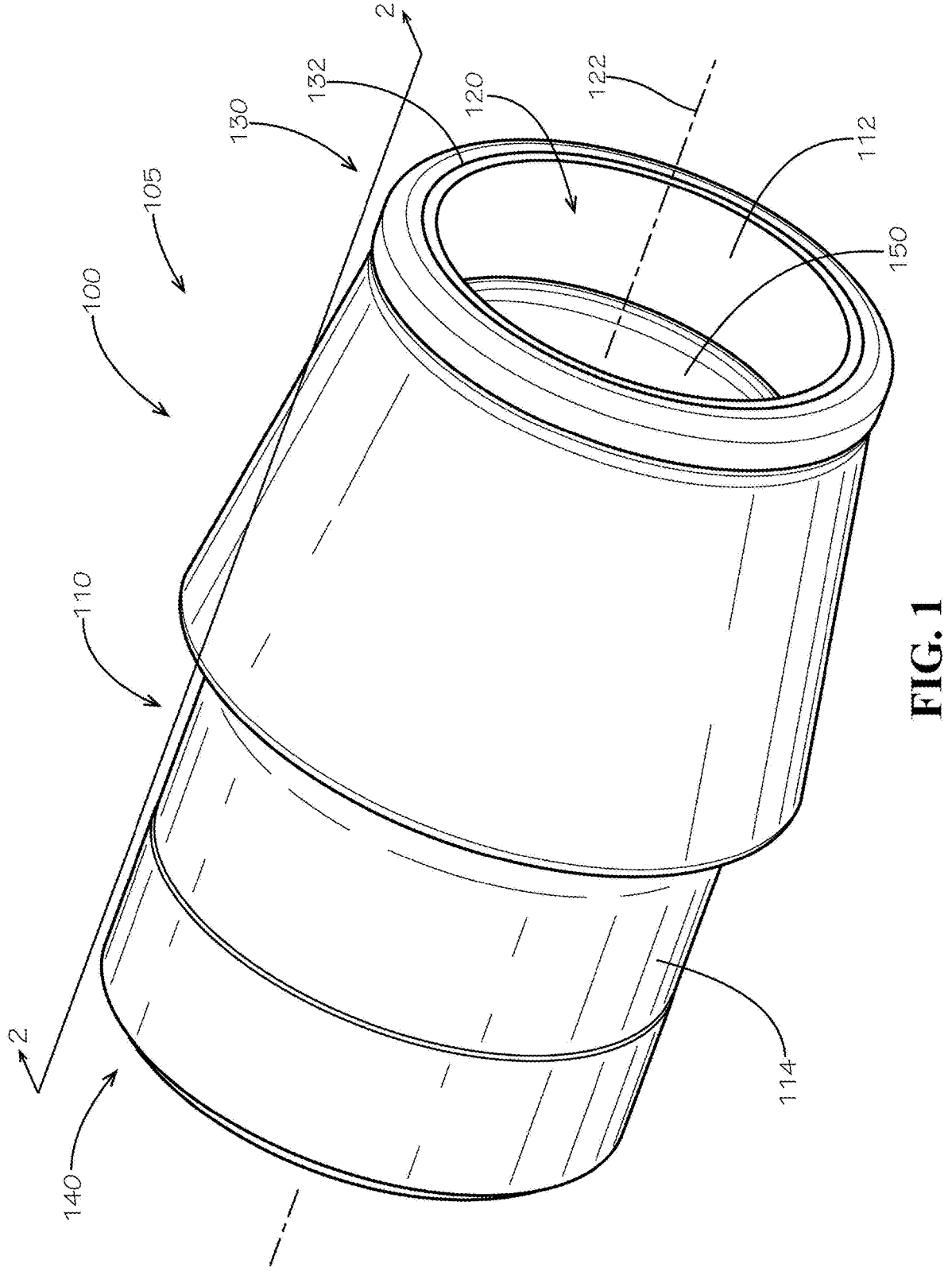
FIG. 1 is a perspective view of a push-type pipe fitting, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pipe fitting and associated methods, systems, devices, and various apparatus. Example aspects of the pipe fitting can comprise a fitting body and a grip ring disposed in a channel of the fitting body. The grip ring can be configured to engage an outer surface of a pipe inserted into the channel. It would be understood by one of skill in the art that the pipe fitting is described in but a few exemplary embodiments among many. No particular terminology or description should be considered limiting on the disclosure or the scope of any claims issuing therefrom.

FIG. 1 is a perspective view of a piping element, such as a pipe fitting 100, in accordance with one aspect of the present disclosure. In the present aspect, the pipe fitting 100 can be a push-type pipe fitting 105, which can also be known as a stab-type fitting, push-to-connect fitting, or push-fit fitting. In other aspects, the pipe fitting 100 can be any other suitable type of fitting known in the art, including but not limited to, couplings, tees, elbows, and the like. In other aspects, the piping element may not be a pipe fitting 100, and rather can be a valve or any other suitable type of piping element known in the art. The pipe fitting 100 can be configured to connect two piping components of a piping system for the transfer of fluid between the two piping components. For example, the pipe fitting 100 can be configured to connect a first piping component 705 (shown in FIG. 7), such as a pipe 710 (shown in FIG. 7) or tubing, to a second piping component (not shown), such as a second pipe, tubing, fitting, or the like. To connect the pipe 710 to the push-type pipe fitting 105 of the present disclosure, a first end 712 (shown in FIG. 7) of the pipe 710 can simply be pushed into a channel 120 of the push-type pipe fitting 105. In the present aspect, fluid, such as water for example, can be transferred through the channel 120 from the pipe 710 to the second piping component, and also in the reverse direction. In other aspects, the fluid can be any other suitable fluid or gas known in the art.

As shown, the pipe fitting 100 can comprise a fitting body 110 defining a fitting inner surface 112 and a fitting outer surface 114 opposite the fitting inner surface 112. The fitting body 110 can further define and first fitting end 130 and a second fitting end 140 opposite the first fitting end 130. In example aspects, the fitting inner surface 112 can define the channel 120, which can extend from the first fitting end 130 of the fitting body 110 to the second fitting end 140 of the fitting body 110. Fluid can flow through the channel 120 from the first fitting end 130 to the second fitting end 140 and/or from the second fitting end 140 to the first fitting end 130. A fitting axis 122 can be defined through a center of the channel 120. In the present aspect, a first fitting opening 132 can allow access to the channel 120 at the first fitting end 130, and a second fitting opening 242 (shown in FIG. 2) can allow access to the channel 120 at the second fitting end 140. According to example aspects, the first end 712 of the pipe 710 can be inserted into the channel 120 through the first fitting opening 132 at the first fitting end 130 of the fitting body 110, and an engagement assembly 150 of the pipe fitting 100 can be configured to engage the pipe 710 within the channel 120 to resist or prohibit withdrawal of the pipe 710 from the channel 120, as will be described in further detail below. Moreover, the second piping component can be inserted into the channel 120 through the second fitting opening 242 at the second fitting end 140 of the fitting body 110. Example aspects of the fitting body 110 can be formed from a metal material in some aspects, such as, for example, brass. In other aspects, the fitting body 110 can be formed from any other suitable material known in the art, including, but not limited to, other metals, plastics, composites, and the like. Furthermore, in other aspects, the engagement assembly 150 can be utilized in any other suitable type of piping element known in the art, including but not limited to, various types of fittings, valves, couplings, and the like, such as wide-range couplings, pipe ends, mechanical joints, gate valves, etc.

Figure 2:
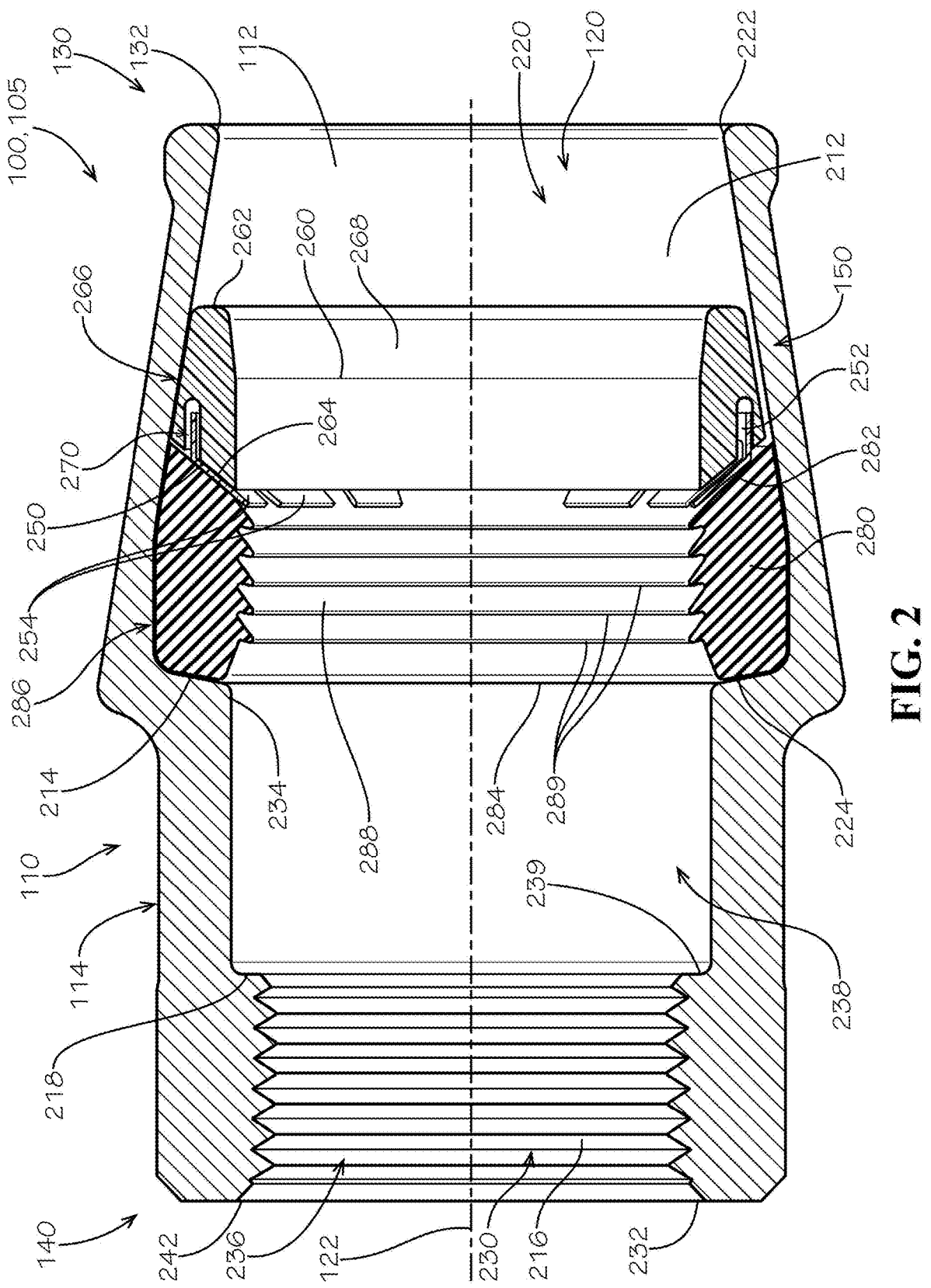
FIG. 2 is a cross-sectional view of the pipe fitting of FIG. 1 taken along line 2-2 in FIG. 1.
Figure 11:
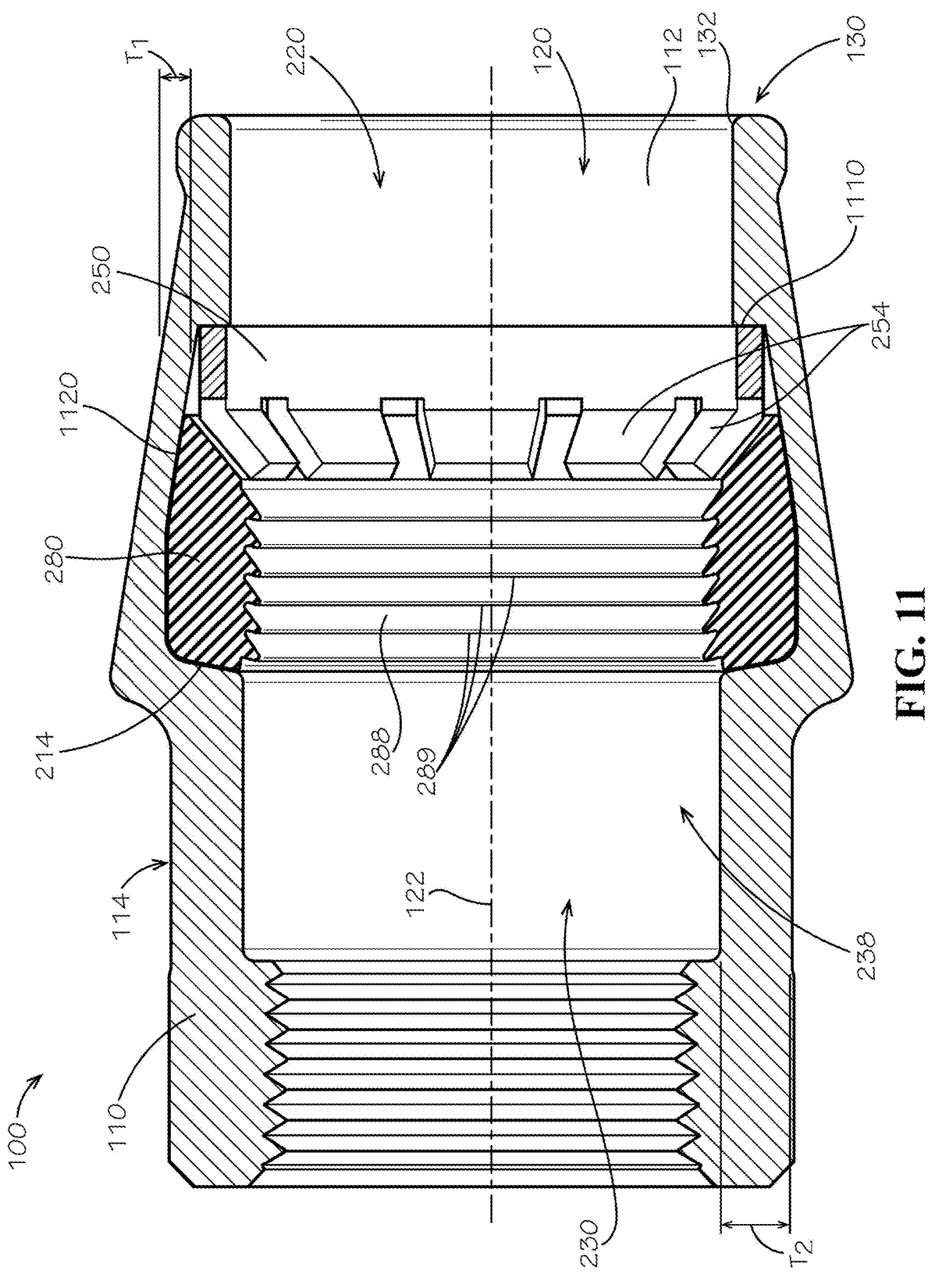
FIG. 11 is a cross-sectional view of the pipe fitting, in accordance with another aspect of the present disclosure.

FIG. 2 illustrates a cross-sectional view of the pipe fitting 100, taken along line 2-2 in FIG. 1. According to example aspects, the channel 120 can generally define an first channel region 220 proximate to the first fitting end 130 and an second channel region 230 proximate to the second fitting end 140. As shown, the first channel region 220 can define a first channel region end 222 at the first fitting end 130 of the fitting body 110 and a second channel region end 224 opposite the first channel region end 222. The second channel region 230 can define a first channel region end 232 at the second fitting end 140 of the fitting body 110 and a second channel region end 234 opposite the first channel region end 232, wherein the second channel region end 234 can terminate at the second channel region end 224. According to example aspects, the engagement assembly 150 can be disposed within the first channel region 220 of the channel 120. In the present aspect, the engagement assembly 150 can comprise a grip ring 250 and a guide ring 260, as shown. Other aspects of the engagement assembly 150 may comprise a grip ring 250 only, as shown in FIG. 11.

The grip ring 250 can be disposed within the first channel region 220 of the channel 120 and can be configured to grip the pipe 710 (shown in FIG. 7) inserted into the channel 120 through the first fitting opening 132. In some aspects, the grip ring 250 can be substantially circular in shape, while in other aspects, the grip ring 250 can define a major arc, minor arc, or a semi-circular shape. For example, in the present aspect, the grip ring 250 can be substantially C-shaped (i.e., can define a major arc). Furthermore, in the present aspect, the grip ring 250 is formed from a singular segment, but in other aspects, the grip ring 250 may comprise a plurality of arcuate grip ring segments. Moreover, in some aspects, additional grip rings 250 may be disposed within the channel 120. As shown, the grip ring 250 can comprise a ring body 252 and plurality of teeth 254 angled inward from the ring body 252 towards the fitting axis 122. The teeth 254 can be configured to deflect outward relative to the ring body 252 as the pipe 710 is inserted through the first fitting end 130 to allow the first end 712 of the pipe 710 to easily slide past the grip ring 250 in an inward direction (i.e., towards the second fitting end 140). However, the teeth 254 can deflect inward to bite or press into an outer surface 714 (shown in FIG. 7) of the pipe 710 when attempting to withdraw the pipe 710 from the channel 120 in an opposite outward direction (i.e., towards the first fitting end 130). The teeth 254 can further bite into the pipe 710 as the grip ring 250 slides within the channel 120 towards the first fitting end 130, as described in further detail below. As such, the grip ring 250 can be configured to resist or prohibit removal of the pipe 710 from the channel 120 once the pipe 710 has been inserted therein.

In some aspects, the pipe fitting 100 can further comprise a guide ring 260 disposed within the first channel region 220 of the channel 120. The guide ring 260 can be generally oriented between the grip ring 250 and the first fitting end 130 of the fitting body 110. According to example aspects, the grip ring 250 can be configured to engage the guide ring 260, and the guide ring 260 can be configured to guide the movement of the grip ring 250 within the channel 120. In example aspects, the movement of the grip ring 250 and guide ring 260 within the channel 120 can be limited to movement within the first channel region 220 of the channel 120, as described in further detail below. In the present aspect, the guide ring 260 can also aid in retaining the grip ring 250 within the channel 120 and preventing the grip ring 250 from popping out through the first fitting opening 132 and/or the second fitting opening 242. Some example aspects of the guide ring 260 can further serve to limit the inward deflection of the teeth 254 of the grip ring 250 to prevent undesirable rolling of the teeth 254, which may occur upon sufficient inward deflection. For example, as shown, the guide ring 260 can define a guide ring first lateral end 262 and an opposite guide ring second lateral end 264. The teeth 254 can deflect slightly inward to bite into the outer surface 714 of the pipe 710, but can be configured to abut the guide ring second lateral end 264 of the guide ring 260 to prohibit further inward deflection. In other aspects, however, the teeth 254 may not abut the guide ring 260 to limit inward deflection. Still other aspects of the pipe fitting 100 may not comprise the guide ring 260, as shown in the example aspect of FIG. 11.

According to example aspects, the guide ring 260 can be substantially circular in shape, though in other aspects, the guide ring 260 can define a major arc, minor arc, or a semi-circular shape. For example, in the present aspect, like the grip ring 250, the guide ring 260 can substantially C-shaped (i.e., can define a major arc). Additionally, while one guide ring 260 is illustrated herein for accommodating the one grip ring 250, in other aspects, additional guide rings 260 may be provided as necessary. As shown, example aspects of the guide ring 260 can generally define an arcuate guide outer surface 266 and an arcuate guide inner surface 268 substantially opposite the guide outer surface 266. The guide outer surface 266 can be configured to engage the fitting inner surface 112 of the fitting body 110. Furthermore, the guide ring 260 can define an arcuate guide slot 270 oriented between the guide outer surface 266 and the guide inner surface 268. In aspects wherein the guide ring 260 defines a circular shape, the guide outer and inner surfaces 266,268 may be substantially annular, and the guide slot 270 formed therebetween can be annular or arcuate, depending upon the shape of the guide ring 260. Example aspects of the guide slot 270 can be configured to receive the ring body 252 of the grip ring 250, or a portion thereof, and in some aspects, the grip ring 250 can be secured to the guide ring 260 by a fastener. For example, the fastener can be an adhesive or any suitable mechanical fastener, such as screws or rivets, or can be any other suitable fastener known in the art. In other aspects, the grip ring 250 may not be fastened to the guide ring 260. In other aspects, the guide ring 260 may not define the guide slot 270, and the grip ring 250 can be coupled to the guide ring 260 by any other suitable fastening technique known in the art. For example the grip ring 250 and guide ring 260 may be molded together.

According to example aspects, the guide outer surface 266 can be configured to slide along the fitting inner surface 112 within the first channel region 220 of the channel 120. As described, the grip ring 250 can be secured to the guide ring 260, such that the grip ring 250 can move along with the guide ring 260. In the present aspect, as shown, the fitting inner surface 112 can define a tapered region 212 that can taper towards the first fitting end 130 of the fitting body 110 substantially along a length of the first channel region 220, such that a diameter of the channel 120 can decrease along the length of the first channel region 220 towards the first fitting end 130. In the present aspect, the guide outer surface 266 can also be configured to taper from the guide ring second lateral end 264 to the guide ring first lateral end 262, such that the taper of the guide outer surface 266 can substantially match or be similar to the taper of the fitting inner surface 112 to facilitate sliding movement of the guide outer surface 266 along the tapered region 212. In the current aspect, the tapered region 212 can define a truncated conical shape, although in other aspects, the tapered region 212 can define any other desired tapering shape, such as a curved shape. According to example aspects, as the guide ring 260 and grip ring 250 slide towards the first fitting end 130 of the fitting body 110, the narrowing diameter of the channel 120 can push (e.g., compress or bend) the guide ring 260 and grip ring 250 radially inward, relative to the fitting axis 122.

According to example aspects, the pipe fitting 100 can further comprise a gasket 280 disposed within the first channel region 220. In example aspects, the gasket 280 can be oriented between the grip ring 250 and the second channel region 230 of the channel 120, and in some cases, the gasket 280 can be positioned substantially proximate to the second channel region 230, as shown. Example aspects of the gasket 280 can comprise a resilient, flexible material, such as a rubber material for example, that can engage the outer surface 714 of the pipe 710 to create a fluid-tight seal therewith. In other aspects, the gasket 280 can comprise any other suitable flexible and resilient material known in the art, including but not limited to polyurethane, TPU (thermoplastic polyurethane), TPE (thermoplastic elastomer), nylon, polypropylene, PVA (polyvinyl alcohol), sealants such as anaerobic sealants, glues, membranes, and resins, various types of rubbers, and the like. The gasket 280 can generally define a gasket first lateral end 282, a gasket second lateral end 284 opposite the gasket first lateral end 282, a gasket outer surface 286, and a gasket inner surface 288 opposite the gasket outer surface 286. In some example aspects, the gasket 280 can define a gasket length extending generally from the gasket first lateral end 282 to the gasket second lateral end 284 that can be greater than a gasket thickness extending generally from the gasket inner surface 288 to the gasket outer surface 286. As shown, the gasket outer surface 286 can be configured to engage the fitting inner surface 112 of the fitting body 110. The gasket inner surface 288 can comprise one or more annular flanges 289 or annular ribs extending substantially inward, relative to the fitting axis 122, and the annular flanges 289 can be configured to engage the outer surface 714 of the pipe 710. The annular flanges 289 can define a substantially triangular cross-section, as illustrated, or can define any other suitable cross-section shape known in the art. In other aspects, the flanges 289 may not be annular and may instead define an arcuate shape. In the present aspect, the fitting inner surface 112 can define an annular shoulder 214 extending radially inward, relative to the fitting axis 122, at the second channel region end 224, adjacent to the second channel region 230. The gasket second lateral end 284 can abut the annular shoulder 214 to prevent the gasket 280 from moving past the shoulder 214 and into the second channel region 230. The shoulder 214 can define an annular shape in the present aspect, though other aspects of the shoulder 214 may define any other suitable shape. In other aspects, the gasket 280 can be utilized in any other suitable type of piping element known in the art, including but not limited to, various types of fittings, valves, couplings, and the like, such as wide-range couplings, pipe ends, mechanical joints, gate valves, etc.

Figure 7:
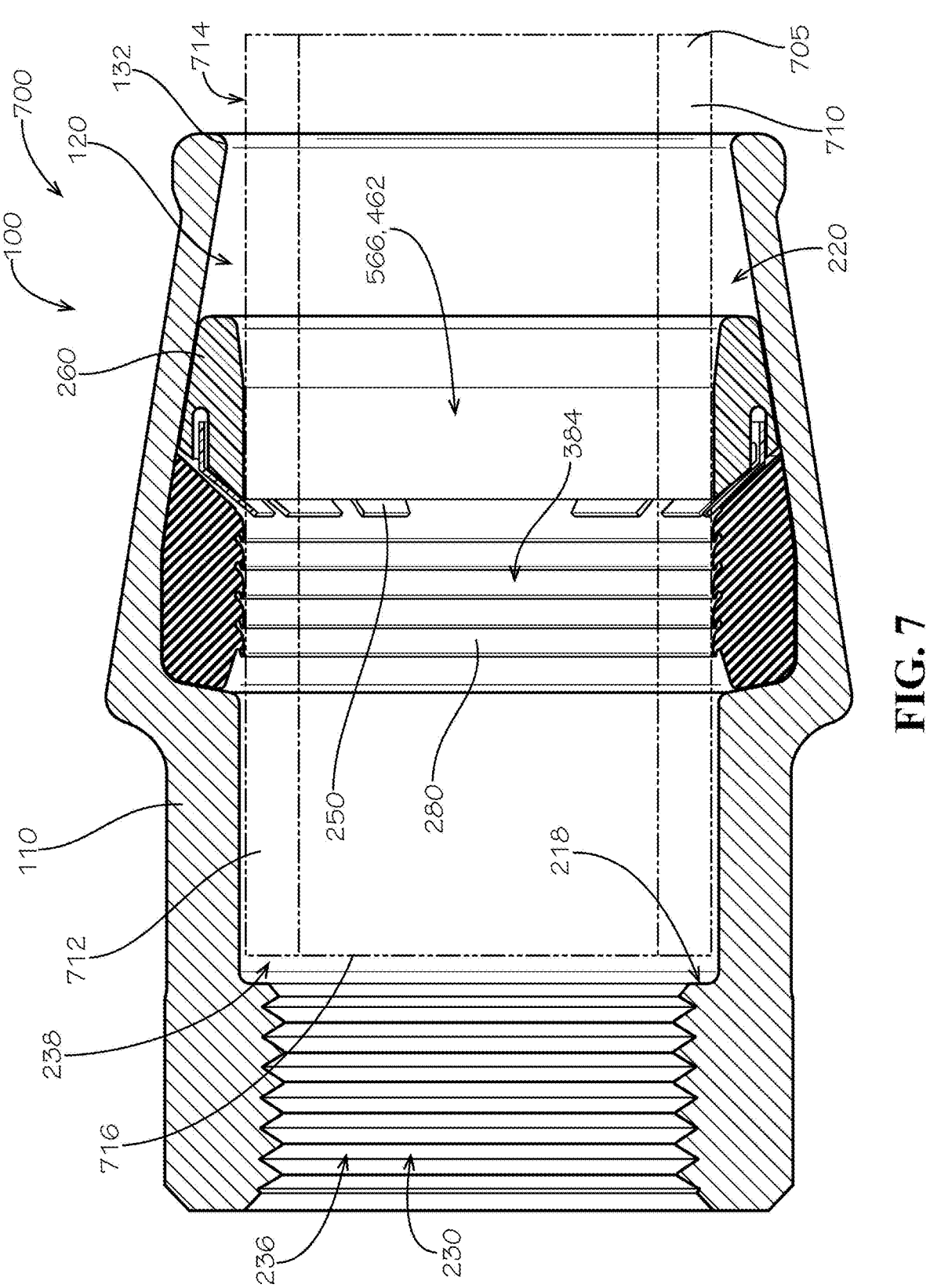
FIG. 7 is a cross-sectional view of a pipe engaged with the pipe fitting of FIG. 1, taken along line 2-2 in FIG. 1, wherein the movable engagement assembly of FIG. 6 is in a first engagement position.

In example aspects, the second channel region 230 of the channel 120 can generally define a first portion 236 proximate to the second fitting end 140 of the fitting body 110 and a second portion 238 extending between the first portion 236 and the second channel region end 234, as shown. According to example aspects, the fitting inner surface 112 can define internal threading 216 along a length of the first portion 236, which can extend generally from the first channel region end 232 to the second portion 238. Thus, in the present aspect, the internal threading 216 does not span a full length of the second channel region 230, but in other aspects, the internal threading 216 may fully span the second channel region 230. In example aspects, the internal threading 216 can be configured to engage external threading formed on the second piping component to connect the second piping component to the pipe fitting 100. In other aspects, however, the fitting inner surface 112 may not define the internal threading, and any other suitable connection technique can be implemented for connecting the second piping component to the pipe fitting 100. Furthermore, in other aspects, the fitting inner surface 112 may also or alternative define the internal threading 216 at the first channel region 220. As shown, the fitting inner surface 112 along a length of the second portion 238 can define a substantially smooth surface. Furthermore, in the present aspect, the fitting inner surface 112 can define a shoulder 218 extending radially inward at a proximal end 239 of the second portion 238, relative to the fitting axis 122. As such, in example aspects, a diameter of the second portion 238 can be greater than a diameter of the first portion 236. In various example aspects, the pipe 710 can be configured to extend through the first channel region 220 and into the second portion 238, as shown in FIG. 7. The pipe 710 may abut the shoulder 218 to prohibit further advancement of the pipe 710 through the channel 120. In other aspects, the diameters of the first portion 236 and second portion 238 may be about equal.

Figures 3A, 3B:
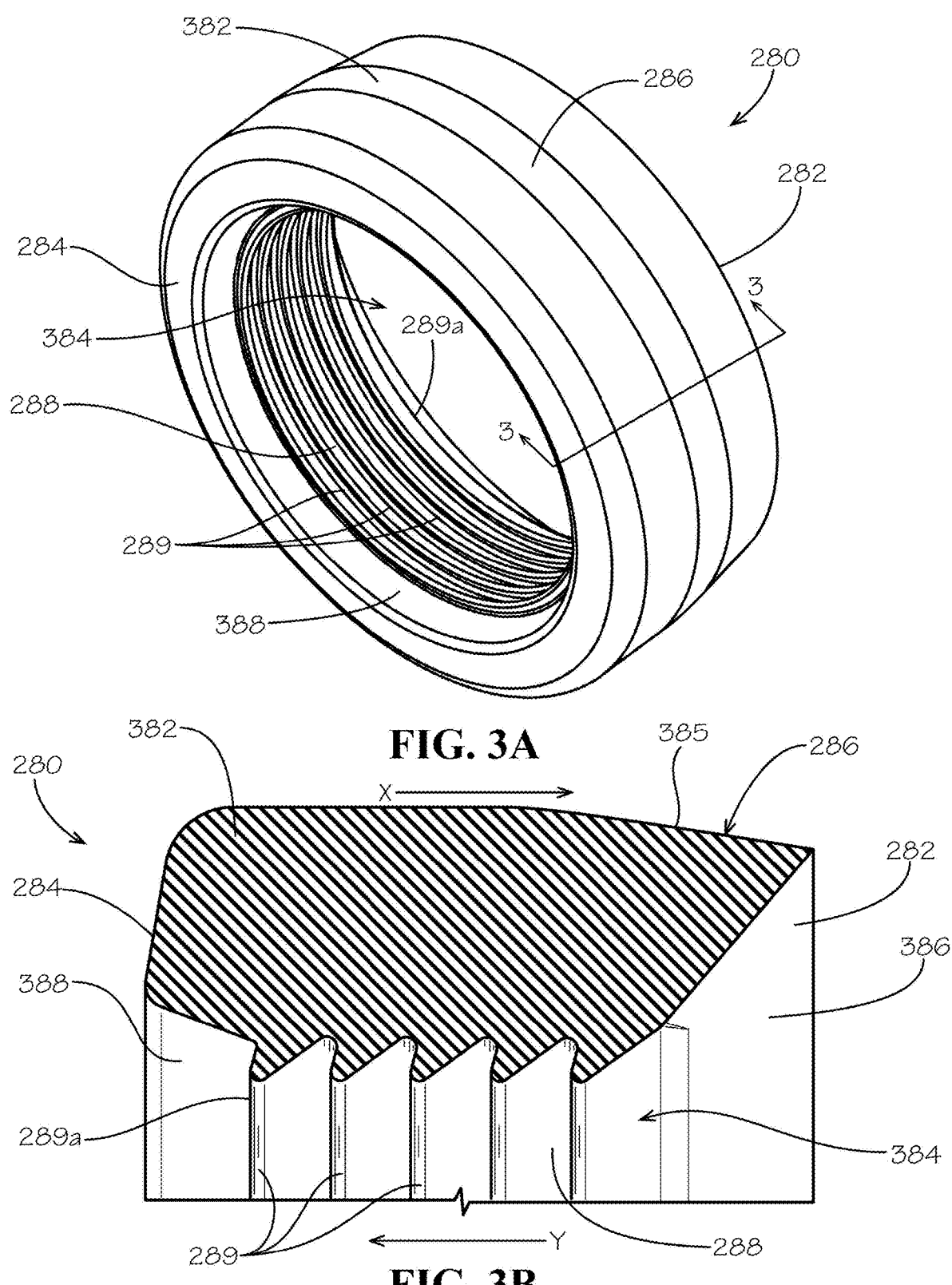
FIG. 3A is a perspective view of a gasket of the pipe fitting of FIG. 1.
FIG. 3B is a detail cross-sectional view of the gasket of FIG. 3A taken along line 3-3 in FIG. 3A.

FIGS. 3A and 3B illustrate a rear perspective view and a detail cross-sectional view of the gasket 280, respectively. Example aspects of the gasket 280 can comprise a substantially cylindrical gasket body 382 defining the gasket first lateral end 282, the gasket second lateral end 284, the gasket outer surface 286, and the gasket inner surface 288. In some aspects, at least a first portion 385 of the gasket outer surface 286 can be angled radially inward in a first axial direction X. In other aspects, the first portion 385 may not be angled radially inward and can be about parallel with the fitting axis 122 (shown in FIG. 1). As shown, the gasket inner surface 288 can define a gasket opening 384 therethrough. The pipe 710 (shown in FIG. 7) can be configured to extend through the gasket opening 384 when the gasket 280 is assembled with the pipe fitting 100 (shown in FIG. 2). According to example aspects, the gasket 280 can define a first lateral end chamfer 386 at the gasket first lateral end 282, i.e., the gasket 280 can taper from the gasket outer surface 286 to the gasket inner surface 288 at the gasket first lateral end 282. As shown, the first lateral end chamfer 386 can be angled radially inward in a second axial direction Y, substantially opposite the first axial direction X. In other aspects, the gasket first lateral end 282 may not be angled and can be about perpendicular to the fitting axis 122. In some example aspects, the inwardly-deflecting teeth 254 (shown in FIG. 2) of the grip ring 250 (shown in FIG. 2), which can also be angled radially inward in the second axial direction Y, can be configured to abut the first lateral end chamfer 386 of the gasket 280, which may limit the outward deflection of the teeth 254. Furthermore, in some example aspects, the first lateral end chamfer 386 can aid in guiding the first end 712 of the pipe 710 into and through the gasket opening 384, reducing the likelihood of the first end 712 of the pipe 710 catching on the gasket first lateral end 282 and compressing the gasket 280 between the pipe 710 and the shoulder 214.

The gasket inner surface 288 can further define a plurality of the annular flanges 289 extending inward into the gasket opening 384, between the first lateral end chamfer 386 and the gasket second lateral end 284. Other aspects of the gasket 280 can define more or fewer flanges 289. In example aspects, each of the flanges 289 can be angled radially inward towards the gasket second lateral end 284 in the second axial direction Y. In other aspects, the flanges 289 may extend substantially radially inward (i.e., about perpendicular to the fitting axis 122), or may be angled towards the gasket first lateral end 282. The flanges 289 can be configured to aid in sealing the gasket 280 with the outer surface 714 (shown in FIG. 7) of the pipe 710. The force of fluid flowing through the channel 120 (shown in FIG. 1) on the gasket 280 can be focused at the tips of the flanges 289, thereby increasing the sealing pressure of the flanges 289 on the outer surface 714 of the pipe 710. Furthermore, if a one of the flanges 289 is scratched or nicked by a burr or other blemish of the pipe 710, the sealing pressure of the other flanges 289 will be unaffected. As such, the flanges 289 can eliminate the step of beveling the first end 712 of the pipe 710 prior to inserting the pipe 710 into the pipe fitting 100 (shown in FIG. 1), which can be difficult and time-consuming.

In the present aspect, the gasket inner surface 288 can also define an inner surface pocket 388 between an end one of the annular flanges 289a and the gasket second lateral end 284, i.e., the gasket 280 can taper from the end flange 289a to the gasket second lateral end 284. In the present aspect, the inner surface pocket 388 can be defined as a chamfer. In other aspects, the shape of the inner surface pocket 388 can vary. In example aspects, the inner surface pocket 388 can further aid in preventing the pipe 710 from catching on the gasket inner surface 288 proximate to the gasket second lateral end 284 and pulling the gasket 280 in the inward direction into the second channel region 230 (shown in FIG. 2) of the channel 120 (shown in FIG. 2) as the pipe 710 is inserted through the channel 120. In example aspects, the inner surface pocket 388 can also aid in preventing the pipe 710 from catching on the gasket inner surface 288 proximate to the gasket second lateral end 284 and pulling the gasket 280 towards the first fitting end 130 as the pipe 710 in drawn in the outward direction. Moreover, in some aspects, the inner surface pocket 388 can allow water, or another fluid received in the channel 120 to press the gasket 280 into the fitting inner surface 112, which can aid in compressing the gasket 280. For example, in some aspects, fluid from the first piping component 705 (shown in FIG. 7), e.g., the pipe 710, or the second piping component may leak into the channel 120 and press against the inner surface pocket 388.

Figure 4:
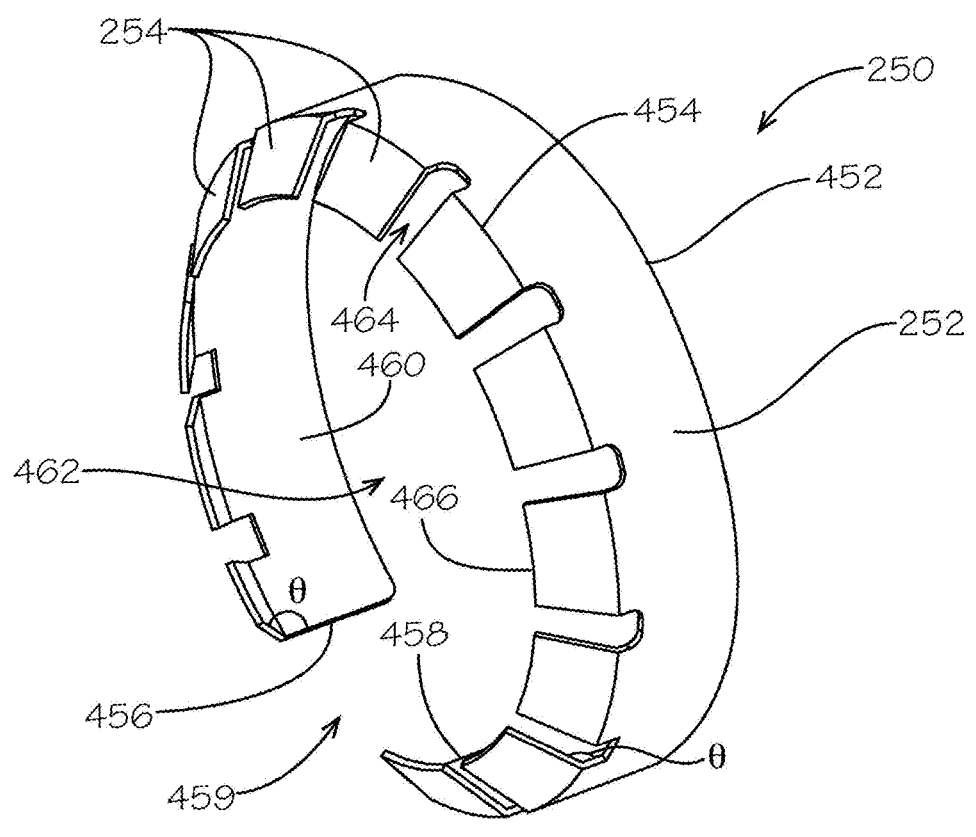
FIG. 4 is a perspective view of a grip ring of the pipe fitting of FIG. 1.

FIG. 4 illustrates a perspective view of the grip ring 250, according to an example aspect. Example aspects of the grip ring 250 can be formed from a metal material, such as, for example, steel, and specifically stainless steel in some aspects. Moreover, aspects of the grip ring comprising stainless steel can be formed from a high gauge stainless steel (e.g., can define a high thickness). The metal material of the grip ring 250 can define a strength sufficient for gripping pipes/tubes of varying materials, including both metal and plastic pipes/tubing, such as the metal pipe 710 shown in FIG. 7. In other aspects, the grip ring 250 can be formed from other metal materials, plastics, composites, or any other material known in the art having suitable strength for gripping pipes and tubing of varying materials. As shown, the grip ring 250 can define the ring body 252, which can be substantially C-shaped in the present aspect. As such, the grip ring 250 can define a grip ring first end 456 and a grip ring second end 458, wherein a gap 459 can be formed between the grip ring first and second ends 456,458. Furthermore, the ring body 252 can define a ring body first lateral end 452 and an opposite ring body second lateral end 454. A grip ring opening 462 can be substantially defined by a ring body inner surface 460 of the ring body 252, and can extend from the ring body first lateral end 452 to the ring body second lateral end 454. The first end 712 (shown in FIG. 7) of the pipe 710 can be configured to extend through the grip ring opening 462 when the grip ring 250 is assembled with the pipe fitting 100 (shown in FIG. 1).

As shown, each of the teeth 254 can extend inward from the ring body second lateral end 454. Each of the teeth 254 can be oriented at an angle θ relative to the ring body 252, which in some aspects can be an obtuse angle. For example, in the present aspect, the angle θ between the teeth 254 and the ring body 252 can be about 135°. In other aspects, the angle θ can be greater or less than 135°. Furthermore, as shown, a tooth slot 464 can be defined between each adjacent pair of teeth 254, and in some aspects, the tooth slot 464 can extend into the ring body 252, as shown. In the present aspect, each of the teeth 254 can define a substantially rectangular shape, such as a square, as shown. A distal engagement edge 466 of each tooth 254 can be configured to bite into the outer surface 714 (shown in FIG. 7) of the pipe 710 to retain the pipe 710 within the channel 120 (shown in FIG. 1), as described in further detail below. A thickness or sharpness of the distal engagement edges 466 of the teeth 254 can be selected based on preferred bite strength. In other aspects, the teeth 254 can define any other suitable shape, such as triangular, or can define varying shapes and/or sizes. Furthermore, because the teeth 254 extend inward and away from the ring body 252, in example aspects, as shown, a diameter of the grip ring opening 462 at the distal engagement edges 466 of the teeth 254 can be less than a diameter of the grip ring opening 462 at the ring body 252.

Figure 5:
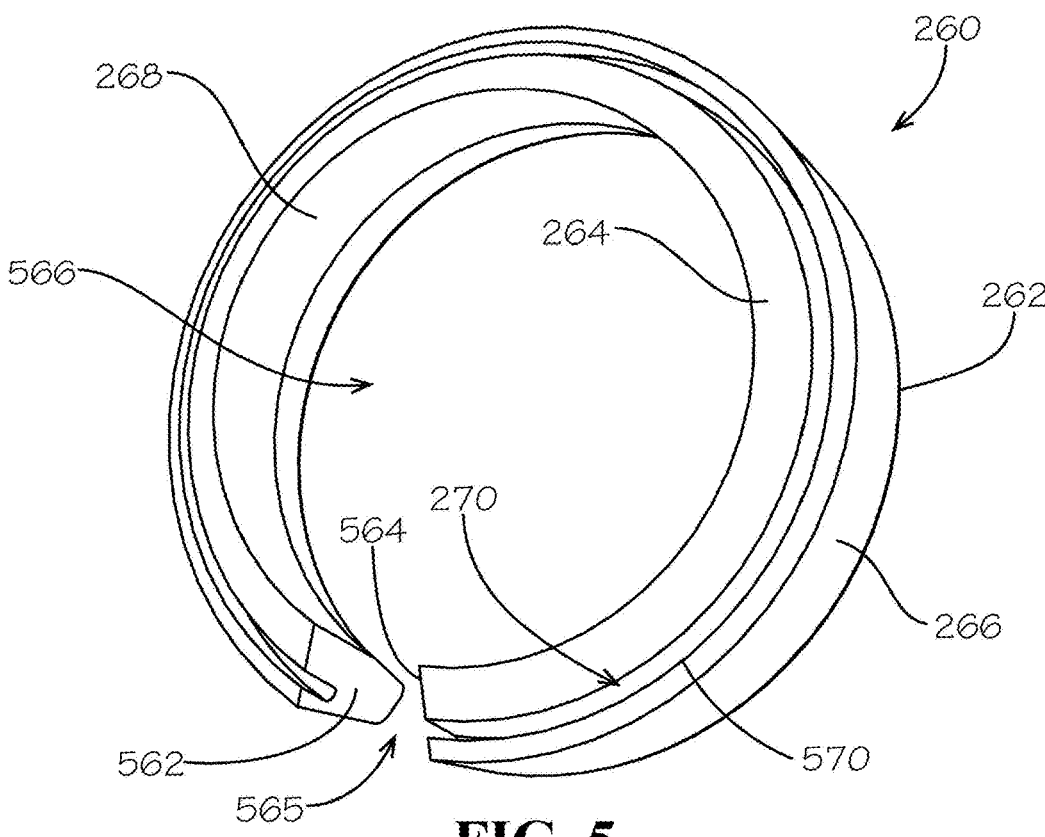
FIG. 5 is a perspective view of a guide ring of the pipe fitting of FIG. 1.

FIG. 5 illustrates the guide ring 260, according to example aspects. In the present aspect, the guide ring 260 can be formed from a plastic material. Plastic materials can be more pliable and less costly than some metal materials. However, other aspects of the guide ring 260 can be formed from any other suitable material known in the art, such as metals, composites, and the like. As shown, the guide ring 260 of the present aspect can be substantially C-shaped. As such, the guide ring 260 can define a guide ring first end 562 and a guide ring second end 564, wherein a gap 565 can be formed between the guide ring first and second ends 562,564. Example aspects of the guide ring 260 can further define the guide ring first lateral end 262, the guide ring second lateral end 264, the guide outer surface 266, and the guide inner surface 268. The guide outer surface 266 can be configured to engage the fitting inner surface 112 (shown in FIG. 1) of the fitting body 110 (shown in FIG. 1). The guide inner surface 268 can define a guide ring opening 566, which can extend from the guide ring first lateral end 262 to the guide ring second lateral end 264. The first end 712 (shown in FIG. 7) of the pipe 710 (shown in FIG. 7) can be configured to extend through the guide ring opening 566 when the guide ring 260 is assembled with the pipe fitting 100 (shown in FIG. 1), and in some aspects, the guide inner surface 268 can engage the outer surface 714 (shown in FIG. 7) of the pipe 710. Each of the guide outer surface 266 and guide inner surface 268 can be substantially smooth in example aspects to allow the guide outer surface 266 to slide easily along the fitting inner surface 112 and to allow the guide inner surface 268 to slide easily along the outer surface 714 of the pipe 710.

According to example aspects, the arcuate guide slot 270 can be defined between the guide outer surface 266 and the guide inner surface 268, and can extend from the guide ring first end 562 to the guide ring second end 564 circumferentially around the guide ring 260. In other aspects, the arcuate guide slot 270 may not extend fully between the guide ring first and second ends 562,564. The arcuate guide slot 270 can extend substantially in the axial direction, relative to the fitting axis 122, from the guide ring second lateral end 264 toward the guide ring first lateral end 262. Thus, a slot opening 570 of the guide slot 270 can be defined at the guide ring second lateral end 264. In some aspects, an outer thickness of the guide ring 260 defined between the guide outer surface 266 and the guide slot 270 can be less than an inner thickness of the guide ring 260 defined between the guide inner surface 268 and the guide slot 270. However, in other aspects, the outer thickness can be greater than or about equal to the inner thickness.

Figure 6:
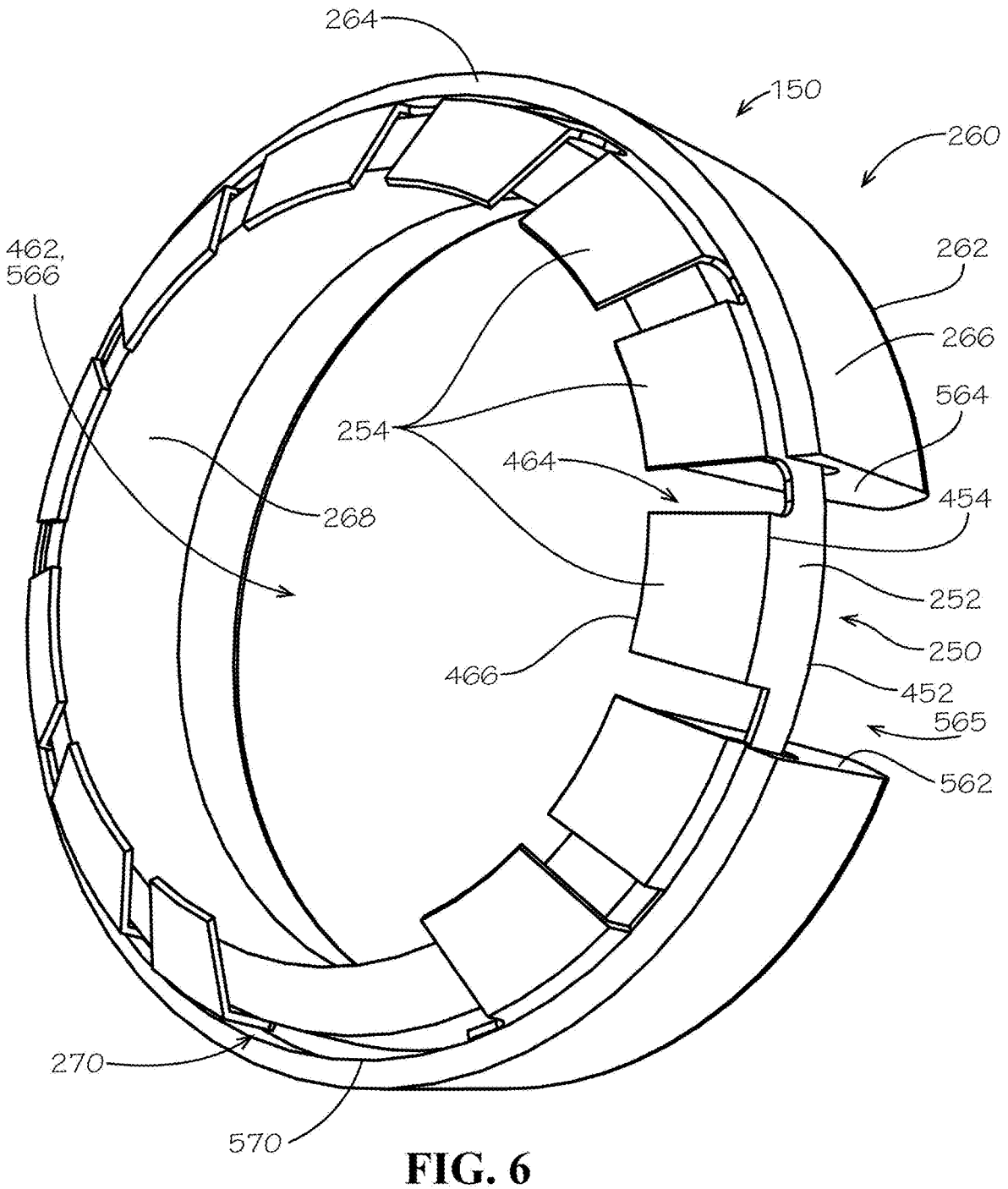
FIG. 6 is a perspective view of the grip ring of FIG. 4 engaged with the guide ring of FIG. 5, wherein the grip ring and guide ring together define a movable engagement assembly.

FIG. 6 illustrates the grip ring 250 assembled with the guide ring 260, according to an example aspect of the present disclosure, wherein the grip ring 250 and guide ring 260 can together define the engagement assembly 150. Example aspects of the engagement assembly 150 can be configured to move within the channel 120 (shown in FIG. 1). For example, in the present aspect, the engagement assembly 150 is configured for sliding movement within the channel 120, as described in further detail below. As shown, the ring body 252 of the grip ring 250 can be inserted into the guide slot 270 of the guide ring 260 at the slot opening 570 at the guide ring second lateral end 264. The teeth 254 of the grip ring 250 can extend substantially inward, relative to the fitting axis 122, and away from the guide ring second lateral end 264. In some aspects, the distal engagement edges 466 of the teeth 254 can extend inward past the guide inner surface 268 of the guide ring 260, such that the diameter of the grip ring opening 462 at the distal engagement edges 466 of the teeth 254 can be less than a diameter of the guide ring opening 566.

Figure 8:
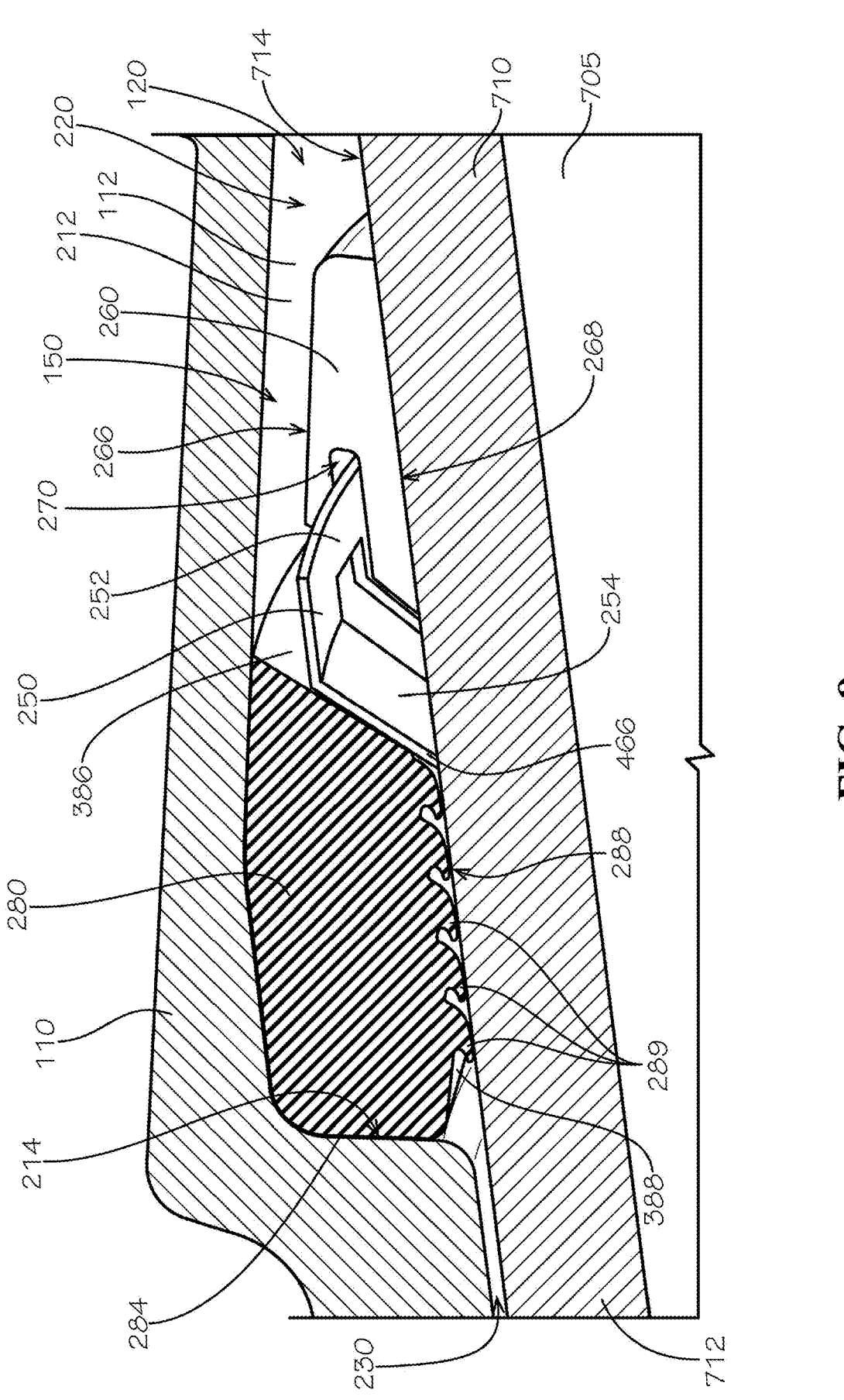
FIG. 8 is a detail cross-sectional perspective view of the movable engagement assembly of FIG. 6 engaged with the pipe of FIG. 7 in the first engagement position, taken along line 2-2 in FIG. 1.

FIGS. 7 and 8 illustrate the first end 712 of the pipe 710 inserted through the first fitting opening 132 of the fitting body 110 in the inward direction and received within the channel 120. In example aspects, the pipe fitting 100 and the pipe 710 can together define a pipe fitting assembly 700. Referring to FIG. 7, in the present aspect, the pipe 710 can extend through the first channel region 220 and into the second portion 238 of the second channel region 230. According to some example aspects, a peripheral edge 716 of the pipe 710 may be configured to abut the shoulder 218 to prohibit further advancement of the pipe 710 through the channel 120 and into the first portion 236 of the second channel region 230. Furthermore, as shown, the portion of the pipe 710 extending through the first channel region 220 can be configured to extend through the guide ring opening 566, the grip ring opening 462, and the gasket opening 384 of the corresponding guide ring 260, grip ring 250, and gasket 280, respectively, as described in additional detail with respect to FIG. 8.

Figure 9:
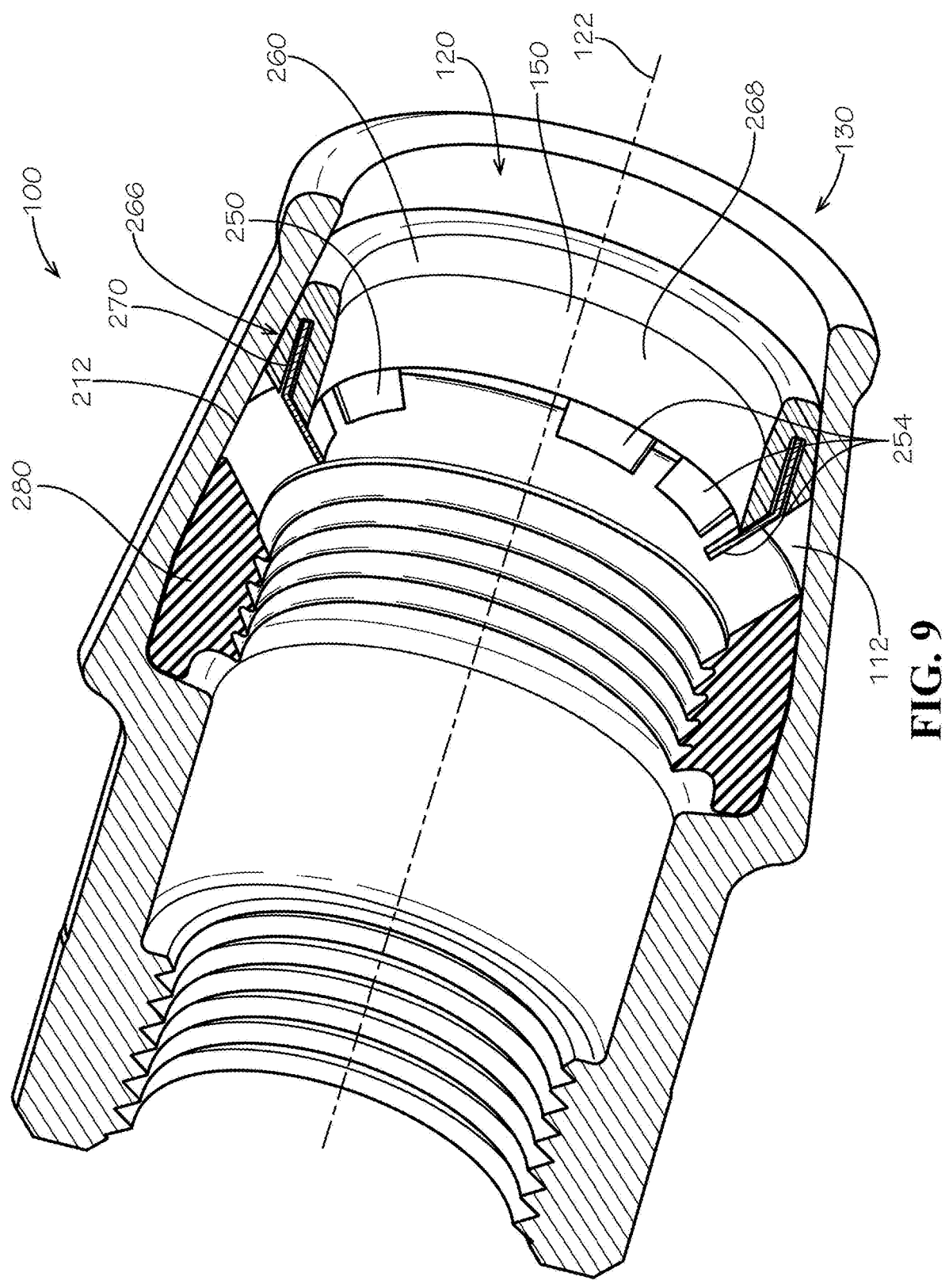
FIG. 9 is a cross-sectional perspective view of the pipe fitting of FIG. 1 taken along line 2-2 in FIG. 1, wherein the movable engagement assembly of FIG. 6 is in a second engagement position.

Referring to FIG. 8, a detail view of the engagement assembly 150 (i.e., the guide ring 260 and grip ring 250) and the gasket 280 engaging the outer surface 714 of the pipe 710 is illustrated, wherein the engagement assembly 150 is in a first engagement position. As shown, when the first end 712 (shown in FIG. 7) of the pipe 710 is inserted through the channel 120, the guide inner surface 268 of the guide ring 260 can abut the outer surface 714 of the pipe 710. In other aspects, the guide inner surface 268 may not initially abut the outer surface 714 of the pipe 710, but may engage the outer surface 714 as the engagement assembly 150 slides along the tapered region 212 towards the first fitting end 130 (shown in FIG. 1). In some aspects, the guide slot 270 defined between the guide inner surface 268 and guide outer surface 266 may allow the guide inner surface 268 to deflect slightly relative to the guide outer surface 266 as the guide ring 260 is sandwiched between the fitting body 110 and the pipe 710. Furthermore, the distal engagement edges 466 of the teeth 254 can engage the outer surface 714 of the pipe 710 and may be deflected slightly outward relative to the fitting axis 122 (shown in FIG. 1) to allow the pipe 710 to further advance through the channel 120. As the teeth 254 deflect outward, the ring body 252 of the grip ring 250 can remain static due to the engagement of the ring body 252 with the arcuate guide slot 270 of the guide ring 260. As the pipe 710 biases the teeth 254 to deflect outward, the teeth 254 can apply a force to the outer surface 714 of the pipe 710 and the distal engagement edges 466 can press against the outer surface 714 of the pipe 710. In some aspects, the teeth 254 may deflect only minimally or not at all, and pipe 710 can be compressed (i.e., a diameter of the pipe 710 can be reduced) under the force applied by the teeth 254, as shown in FIG. 9. The annular flanges 289 of the gasket inner surface 288 can also engage and be compressed by the outer surface 714 of the pipe 710, to form a fluid-tight seal between the pipe 710 and the gasket 280. However, the inner surface pocket 388 defined by the gasket inner surface 288 can taper away from the outer surface 714 of the pipe 710, preventing the pipe 710 from engaging the gasket inner surface 288 at the inner surface pocket 388 and thus reducing the likelihood that the pipe 710 will catch on the gasket inner surface 288 proximate to the gasket second lateral end 284 and pull the gasket 280 into the second channel region 230. The gasket second lateral end 284 can abut the shoulder 214 defined by the fitting inner surface 112 to further prevent the gasket 280 from being pulled into the second channel region 230.

According to example aspects, to increase the grip of the teeth 254 on the outer surface 714 of the pipe 710, the pipe 710 can be pulled in the reverse outward direction, towards the first fitting opening 132 (shown in FIG. 1). In some aspects, the pipe 710 can be held in tension, which can draw the pipe 710 in the reverse outward direction. As described above, when the first end 712 of the pipe 710 is inserted into the channel 120 in the inward direction, the outer surface 714 of the pipe 710 can deflect the teeth 254 of the grip ring 250 outward, relative to the fitting axis 122, and in turn, the distal engagement edges 466 of the teeth 254 can press into and grip the outer surface 714. As the pipe 710 is then drawn toward the first fitting end 130 in the outward direction, the distal engagement edges 466 of the teeth 254 can remain engaged with the outer surface 714 of the pipe 710, and the teeth 254 can be deflected inward, relative to the fitting axis 122, such that the distal engagement edges 466 of the teeth 254 can bite even deeper into the outer surface 714. Furthermore, the grip ring 250 and the guide ring 260 can define the slidable engagement assembly 150, which can be configured to slide within the channel 120 as the pipe 710 is drawn towards the first fitting end 130 in the outward direction. For example, the slidable engagement assembly 150 can be oriented in at least the first engagement position, as shown in the present FIG. 8, and a second engagement position, as shown in FIG. 9. In the first engagement position, the pipe 710 can be inserted into the channel 120 through the first fitting end 130 in the inward direction and the engagement assembly 150 can abut or be oriented proximate to the gasket 280, as shown. In the second engagement position, the pipe 710 can be moved in the reverse, outward direction, and the engagement assembly 150 engaged with the outer surface 714 of the pipe 710 can slide away from the gasket 280 towards the first fitting end 130 along with the pipe 710.

FIG. 9 illustrates a cross-sectional view of the pipe fitting 100, wherein the pipe 710 (shown in FIG. 7) has been removed for visibility of the interior components of the pipe fitting 100. The engagement assembly 150 comprising the grip ring 250 and the guide ring 260 is shown in the second engagement position. According to example aspects, as the pipe 710 in drawn in the outward direction, the teeth 254 can deflect inward to bite further into the outer surface 714 (shown in FIG. 7) of the pipe 710, securing the grip ring 250 to the pipe 710. As such, the engagement assembly 150 can be drawn towards the first fitting end 130 in the outward direction along with the pipe 710. As described above, in example aspects, the tapered region 212 of the fitting inner surface 112 can taper (i.e., the diameter of the channel 120 can be gradually reduced) towards the first fitting end 130. Therefore, as the pipe 710 pulls the engagement assembly 150 towards the first fitting end 130, the narrowing diameter of the fitting inner surface 112 can press the engagement assembly 150 into deepening engagement with the pipe 710, thereby increasing the grip of the teeth 254 on the outer surface 714 and further securing the first end 712 (shown in FIG. 7) of the pipe 710 within the channel 120. As previously described, in some aspects, the guide slot 270 defined between the guide inner surface 268 and guide outer surface 266 may allow the guide inner surface 268 to deflect relative to the guide outer surface 266, further facilitating the sliding of the engagement assembly 150 into the narrowing diameter of the channel 120. Additionally, in some aspects, as the pipe 710 is held in tension or otherwise pulled in the outward direction, the pipe 710 can stretch and a diameter of the pipe 710 can be reduced. As the diameter of the pipe 710 is reduced, the engagement of the teeth 254 with outer surface 714 of the pipe 710 may lessen, allowing the pipe 710 to be drawn further out of the channel 120 in the outward direction. However, as described above, the engagement assembly 150 can be drawn towards the first fitting end 130 along with the pipe 710, and the narrowing diameter of the fitting inner surface 112 can again force the engagement assembly 150 into a deeper engagement with the outer surface 714 of the pipe 710, thereby re-securing the first end 712 of the pipe 710 within the channel 120.

Figure 10:
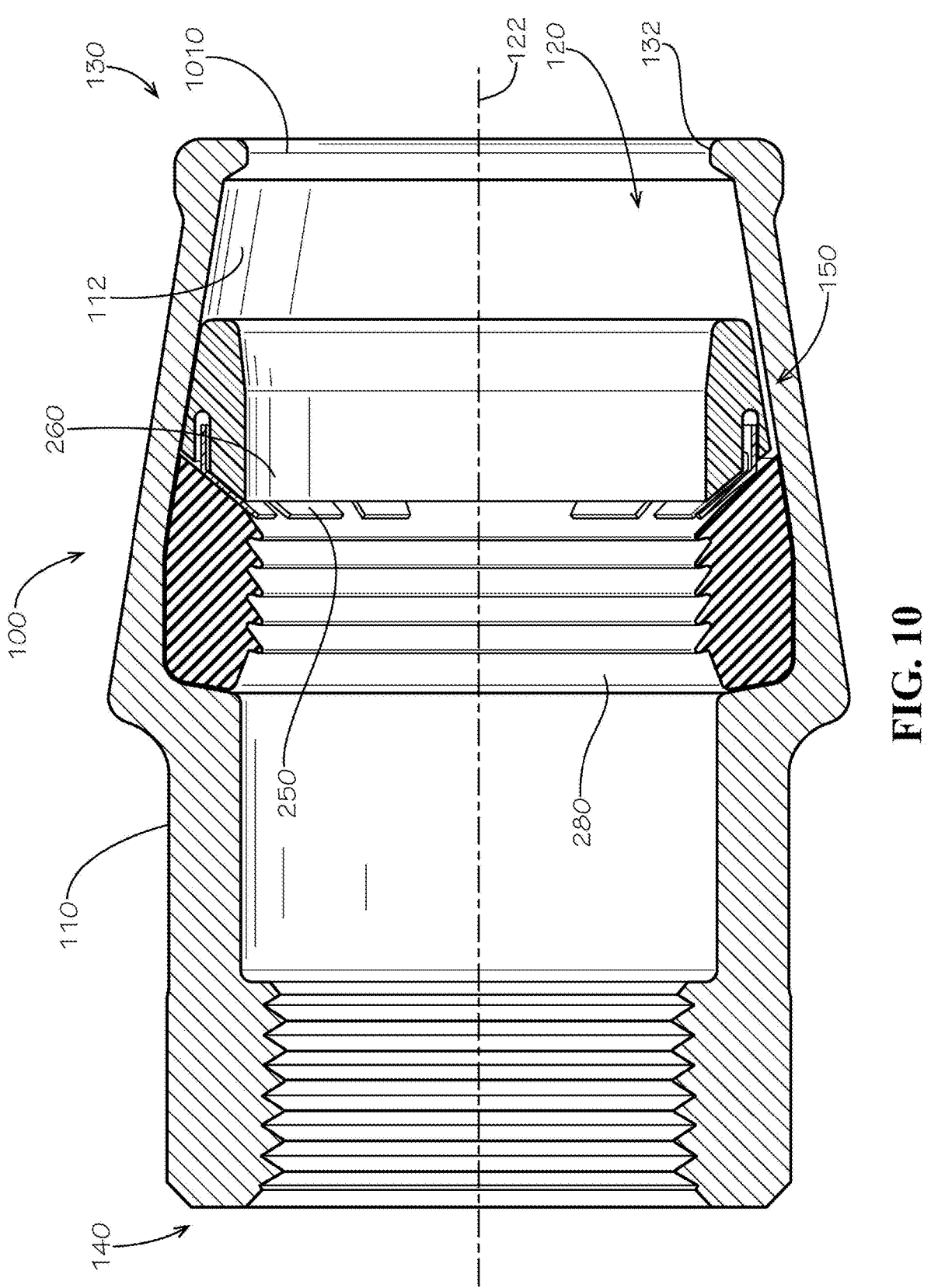
FIG. 10 is a cross-sectional view of the pipe fitting, in accordance with another aspect of the present disclosure.

As shown in FIG. 10, in some aspects, the fitting inner surface 112 can define an annular retaining lip 1010 extending radially inward, relative to the fitting axis 122, at the first fitting end 130 of the fitting body 110. The annular retaining lip 1010 can decrease the diameter of the first fitting opening 132, as compared to the fitting body 110 shown in FIGS. 1, 2, and 7-9. As such, the annular retaining lip 1010 can decrease a clearance between the fitting inner surface 112 and the pipe 710 (shown in FIG. 7) at the first fitting end 130, which can aid in retaining the guide ring 260 and grip ring 250 within the channel 120, preventing the guide ring 260 and grip ring 250 from escaping the channel 120 through the first fitting opening 132. In some aspects, the annular retaining lip 1010 can be monolithically formed with the fitting body 110 and can comprise the same material as the fitting body 110. For example, in the present aspect, like the fitting body 110, the annular retaining lip 1010 can comprise a brass material. In other aspects, the annular retaining lip 1010 may not be monolithically formed with the fitting body 110 and/or may not comprise the same material as the fitting body 110. Additionally, while the retaining lip 1010 is formed at the first fitting end 130 in the present aspect, in other aspects, the retaining lip 1010 may be formed at any suitable location on the fitting inner surface 112 between the engagement assembly 150 and the first fitting end 130. In further example aspects, the pipe fitting 100 may define a retaining projection(s) in place of the annular retaining lip 1010.

FIG. 11 illustrates the pipe fitting 100 according to another example aspect of the present disclosure. In the present aspect, the pipe fitting 100 comprises the fitting body 110 defining the fitting outer surface 114 and the fitting inner surface 112. The fitting inner surface 112 defines the channel 120 through the fitting body 110, and the channel 120 defines the first channel region 220 and the second channel region 230. The second channel region 230 can be substantially similar to the second channel region 230 shown in the aspect of FIGS. 2 and 7-9 and the aspect of FIG. 10. As shown, the gasket 280 can be oriented within the first channel region 220 proximate to the second channel region 230 and can abut the shoulder 214. The gasket inner surface 288 can define the annular flanges 289 configured to engage and create a fluid-tight seal with the outer surface 714 (shown in FIG. 7) of the pipe 710 (shown in FIG. 7). In the present aspect, the grip ring 250 can also be oriented within the first channel region 220 between the gasket 280 and the first fitting opening 132 and can define the teeth 254 configured to grip the outer surface 714 of the pipe 710. In some aspects, the pipe fitting 100 may not comprise the guide ring 260 (shown in FIG. 2) and alternative mechanisms can be provided for retaining the grip ring 250 within the channel 120. For example, in the present aspect, the fitting inner surface 112 can define a shoulder 1110 extending radially inward, relative to the fitting axis 122, between the grip ring 250 and the first fitting opening 132. As such, the fitting inner surface 112 can define an inner surface groove 1120 between the shoulder 214 and the shoulder 1110. In some example aspects, the fitting inner surface 112 can define a minimum thickness $T_1$ of the fitting body 110 at the inner surface groove 1120. That is to say, the thickness $T_1$ of the fitting body 110 at the inner surface groove 1120 can be less than a thickness $T_2$ of the fitting body 110 at any point outside of the inner surface groove 1120. As one particular example, the thickness $T_1$ of the fitting body 110 at the inner surface groove 1120 can be less than the thickness $T_2$ of the fitting body 110 at the second portion 238. As shown, the grip ring 250 can be configured to abut the shoulder 1110 to prohibit movement of the grip ring 250 towards the first fitting end 130, and such that the gasket 280 and the grip ring 250 can span the inner surface groove 1120 and can be retained therein between the pair of shoulders 214, 1110.

Figure 12:
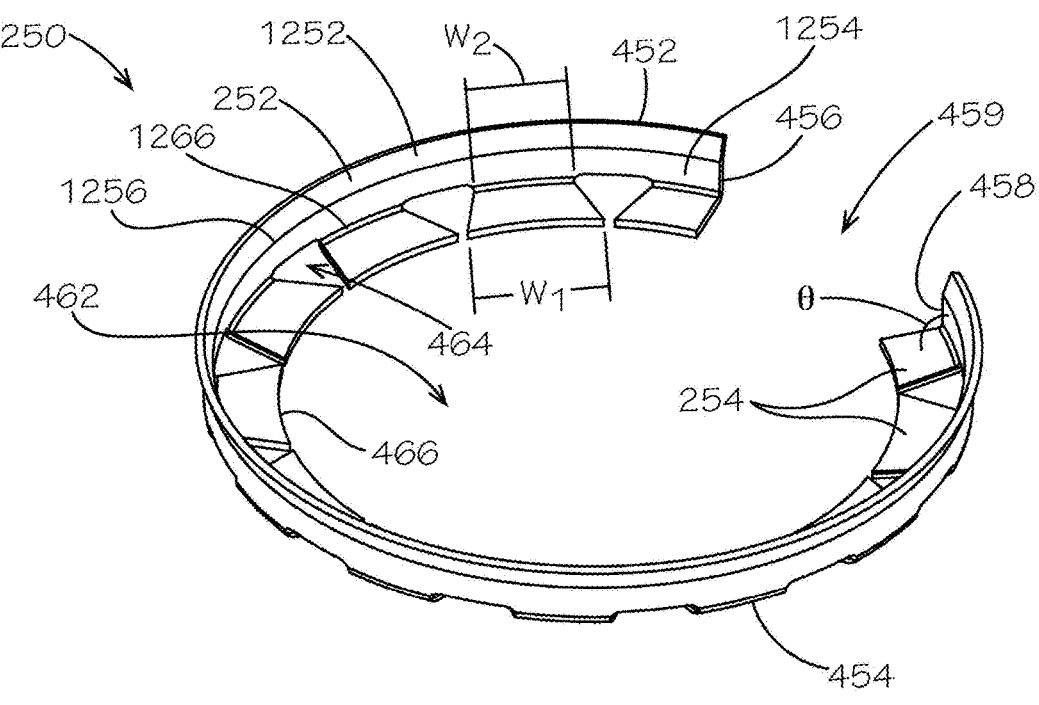
FIG. 12 is a front perspective view of the grip ring, in accordance with another aspect of the present disclosure.

FIG. 12 illustrates the grip ring 250 according to another example aspect of the present disclosure. The present grip ring 250 can be formed from a metal material, such as, for example, stainless steel, and may be formed from a high gauge stainless steel, as described above. Other aspects of the grip ring 250 can be formed from other metal materials, plastics, composites, or any other material known in the art having suitable strength for gripping pipes and tubing of varying materials. As shown, the grip ring 250 can define the substantially C-shaped ring body 252, which can define the grip ring first end 456 and the opposing grip ring second end 458. The gap 459 can be defined between the grip ring first and second ends 456,458. The grip ring 250 can further define the grip ring opening 462 through which the first end 712 (shown in FIG. 7) of the pipe 710 (shown in FIG. 7) can extend. As shown, the ring body 252 can define the ring body first lateral end 452 and the ring body second lateral end 454, with the teeth 254 extending from the ring body second lateral end 454. In the present aspect, the ring body 252 can define an arcuate first section 1252 formed at or near the ring body first lateral end 452 and an arcuate second section 1254 formed at or near the ring body second lateral end 454. Each of the first and second sections 1252, 1254 can be substantially C-shaped and can extend from the grip ring first end 456 to the grip ring second end 458. In the present aspect, the first and second sections 1252, 1254 can be joined together along their lengths and can be monolithically formed as a singular component. In other aspects, the first and second sections 1252,1254 may be separately formed. According to example aspects, the first section 1252 can be angled outward from the second section 1254, as shown, such that an obtuse angle can be defined between the first and second sections. For example, the first section 1252 can be bent relative to the second section 1254 at a bend line 1256. However, in other aspects, the first section 1252 may not be angled relative to the second section 1254. According to example aspects, the angle between first section 1252 and second section 1254 can create an interference fit between the ring body 252 and the guide slot 270 (shown in FIG. 13), thus improving the hold of the grip ring 250 on the guide ring 260 (shown in FIG. 13).

In example aspects, each of the teeth 254 can be joined with the ring body second lateral end 454 at a proximal edge 1266 thereof, and can extend substantially radially inward from the ring body 252. The proximal edge 1266 of each tooth 254 can be oriented substantially opposite the corresponding distal engagement edge 466 of the tooth 254. For example, each of the teeth 254 can be oriented at the angle θ relative to the ring body 252, which can be about 90° (i.e., about a right angle) in the present aspect. In other aspects, as described above, the teeth 254 may be oriented at an obtuse angle relative to the ring body 252, or can be oriented at an acute angle in still other aspects. A one of the tooth slots 464 can be defined between each adjacent pair of teeth 254, and in some aspects, the tooth slot 464 may extend into the ring body 252. In the present aspect, each of the teeth 254 can be substantially trapezoidal in shape, as shown. For example, each of the teeth 254 may substantially define an isosceles triangle shape, wherein each of the teeth 254 can define a width $W_1$ at its distal engagement edge 466 that can be greater than a width $W_2$ at its proximal edge 1266. Moreover, each of the proximal edge 1266 and distal engagement edge 466 of each tooth 254 can be curved in the present aspect. For example, as shown, the distal engagement edge 466 can define a concave curve arcing toward the ring body 252. The curved distal engagement edges 466 of the teeth 254 can be configured to better conform to the curved outer surface 714 (shown in FIG. 7) of the pipe 710, as the teeth 254 bite into the outer surface 714. Furthermore, as described above, a thickness or sharpness of the distal engagement edges 466 of the teeth 254 can be selected based on preferred bite strength. Additionally, in other aspects, the teeth 254 can define any other suitable shape and/or size, and/or the distal engagement edges 466 and/or proximal edges 1266 thereof may not be curved.

Figure 13:
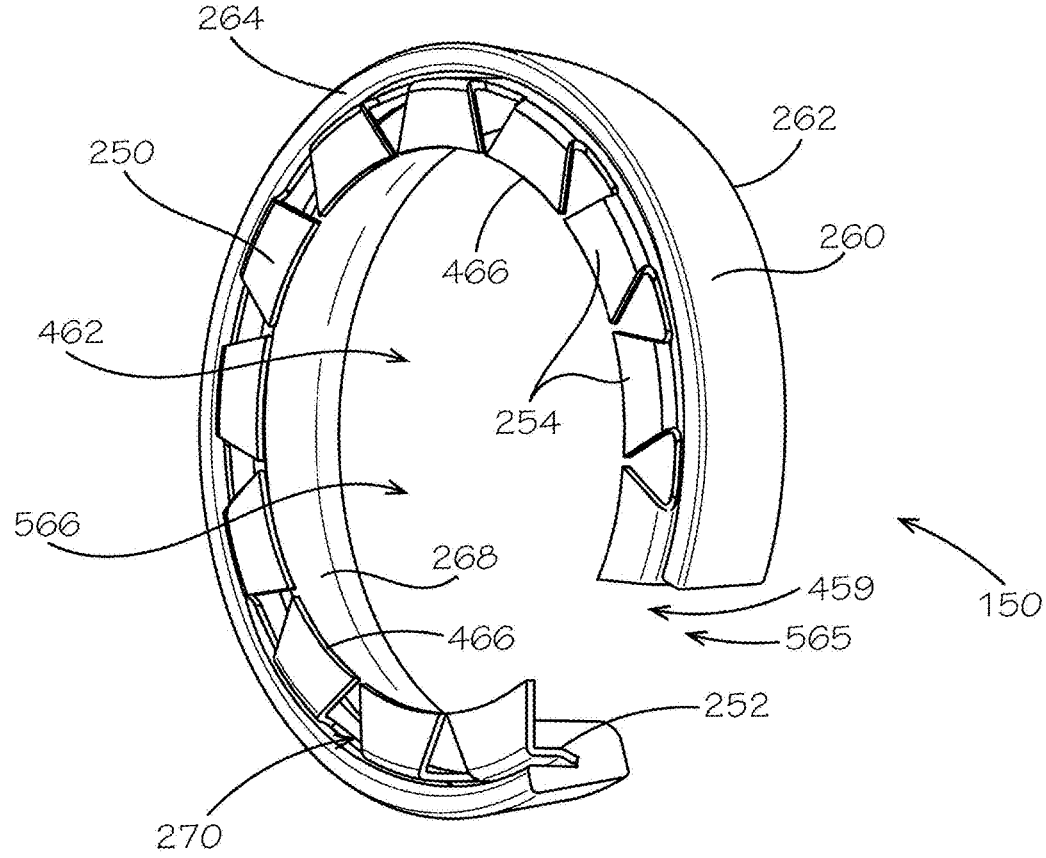
FIG. 13 is a rear perspective view of the grip ring of FIG. 12 engaged with guide ring, in accordance with another aspect of the present disclosure.

FIG. 13 illustrates the grip ring 250 of FIG. 12 assembled with the guide ring 260, according to an example aspect of the present disclosure, wherein the grip ring 250 and guide ring 260 can together define the engagement assembly 150. The ring body 252 of the grip ring 250 can be inserted into the guide slot 270 of the guide ring 260 at the guide ring second lateral end 264. The teeth 254 of the grip ring 250 can extend substantially radially inward and away from the guide ring 260 at the guide ring second lateral end 264. The distal engagement edges 466 of the teeth 254 can extend radially inward past the guide inner surface 268 of the guide ring 260, such that the diameter of the grip ring opening 462 at the distal engagement edges 466 of the teeth 254 can be less than a diameter of the guide ring opening 566.

Figure 14:
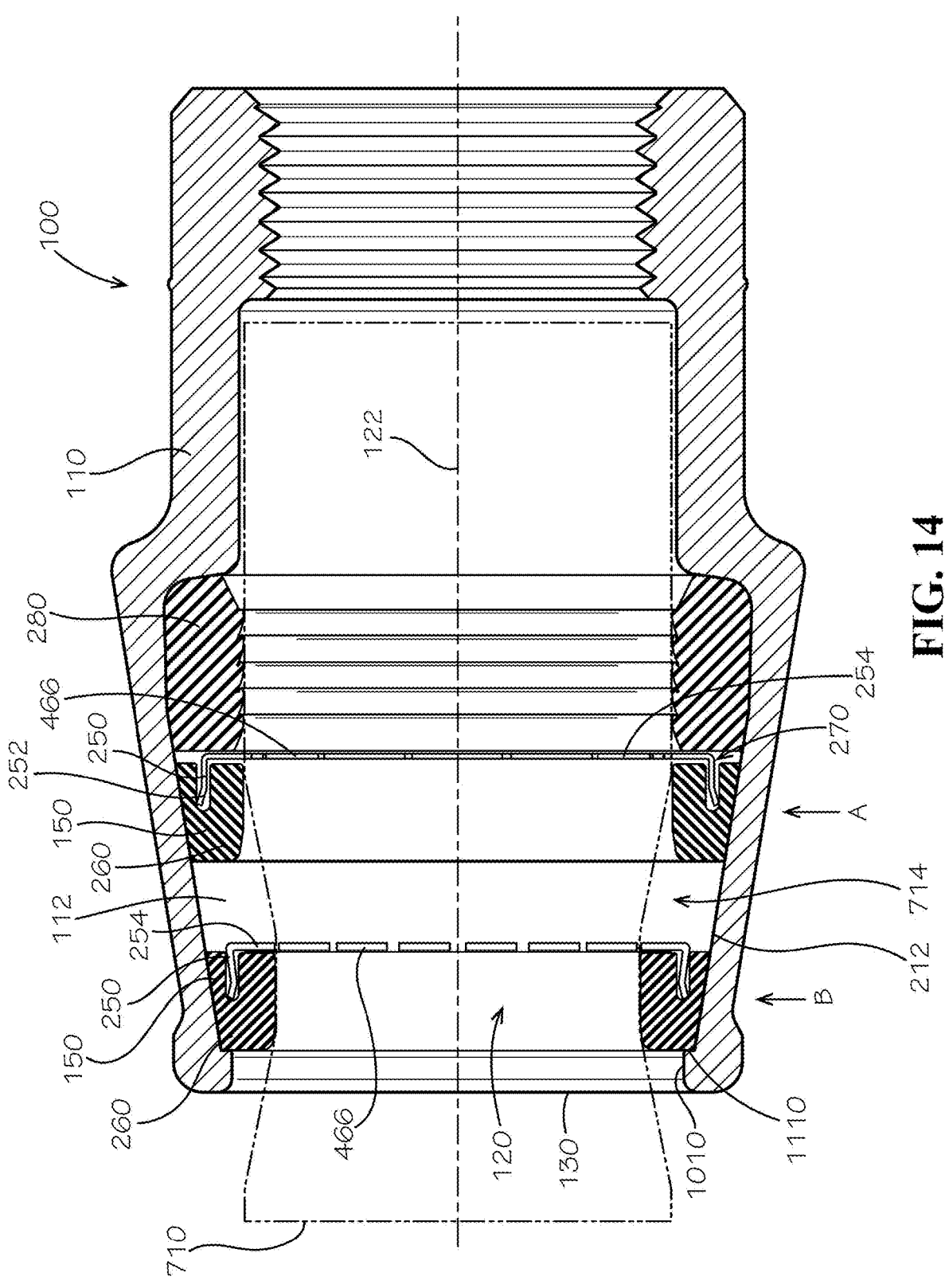
FIG. 14 is a cross-sectional view of the pipe fitting, in accordance with another aspect of the disclosure.

FIG. 14 illustrates the engagement assembly 150 (i.e., the guide ring 260 and grip ring 250) and the gasket 280 received in the channel 120 of the pipe fitting 100. The engagement assembly 150 is illustrated in both the first engagement position, as indicated by "A", and the second engagement position, as indicated by "B". As described above, in the first engagement position A, the pipe 710 can be inserted into the channel 120 through the first fitting end 130 in the inward direction and the engagement assembly 150 can abut or be oriented proximate to the gasket 280, as shown. In the second engagement position B, the pipe 710 can be moved in the reverse, outward direction, and the engagement assembly 150 can slide away from the gasket 280 towards the first fitting end 130 along with the pipe 710. More specifically, according to example aspects, the distal engagement edges 466 of the teeth 254 can grip the outer surface 714 of the pipe 710 in the first engagement position A. As the pipe 710 is drawn in the outward direction, the engagement assembly 150 can slide along the tapered region 212 of the fitting inner surface 112 towards the first fitting end 130 of the fitting body 110. In some aspects, portions of the engagement assembly 150 can be compressed or flexed as it is slid towards the second engagement position B to accommodate the decreasing diameter of the channel 120. For example, in some aspects, the corresponding gaps 459,565 (shown in FIGS. 12 and 13, respectively) formed in the grip ring 250 and guide ring 260, respectively, may allow the grip ring 250 and guide ring 260 to be compressed radially inward. Additionally, in the present aspect, the teeth 254 can increasingly press into the outer surface 714 of the pipe 710 as the engagement assembly 150 moves towards the second engagement position B, and the pipe 710 can be deflected or compressed inward by the teeth 254, thereby reducing the diameter of the pipe at the teeth 254. As shown, the teeth 254 can remain about perpendicular to the pipe 710 as the teeth 254 deflect the pipe 710 inward. In other aspects, the teeth 254 of the grip ring 250 may be deflected slightly outward relative to the fitting axis 122 as the teeth 254 bite into the pipe 710, as described above. As the pipe 710 biases the teeth 254 to deflect outward, the teeth 254 can apply an increasing force to the outer surface 714 of the pipe 710, thereby increasing the grip of the grip ring 250 on the pipe 710. Moreover, in the present aspect, the annular retaining lip 1010 can be provided at the first fitting end 130 of the fitting body 110 to decrease a clearance between the fitting inner surface 112 and the pipe 710. The retaining lip 1010 can aid in retaining the guide ring 260 and grip ring 250 within the channel 120. In some aspects, the retaining lip 1010 can define the shoulder 1110, and the engagement assembly 150 can abut the shoulder 1110 in the second engagement position B, as shown.

Figure 15:
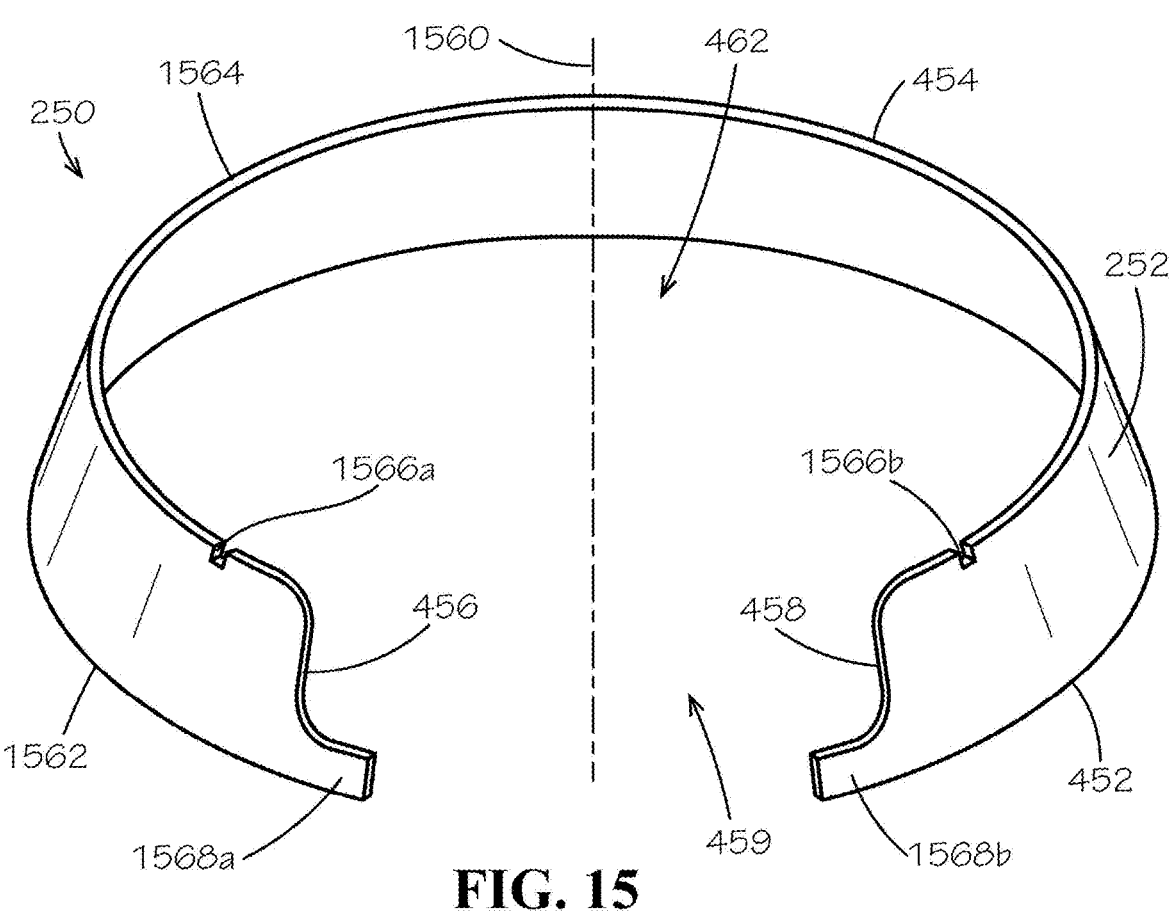
FIG. 15 is a rear perspective view of the grip ring in accordance with another aspect of the present disclosure.
Figure 16:
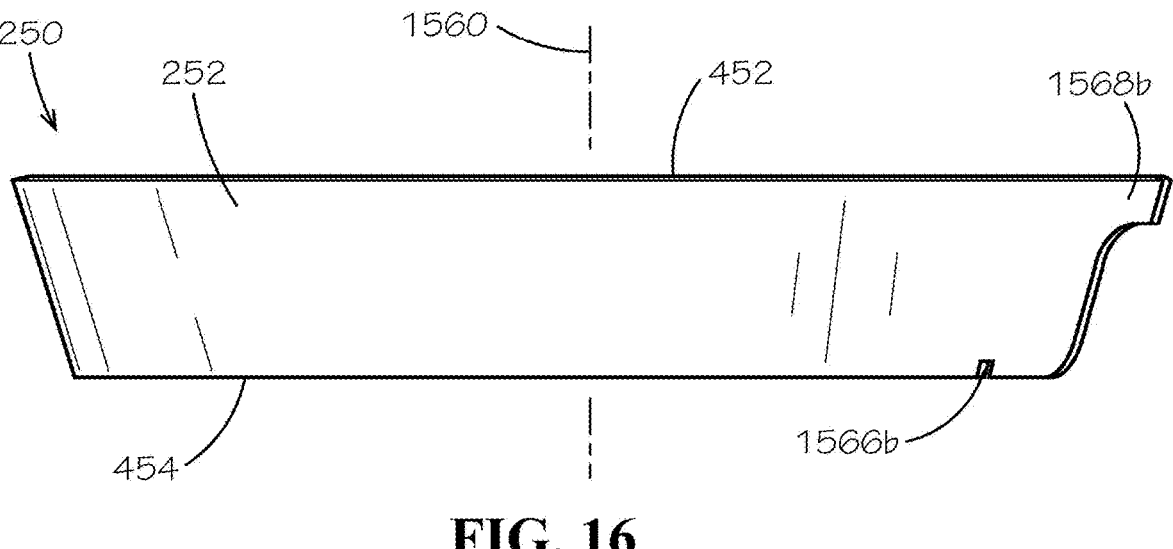
FIG. 16 is a side view of the grip ring of FIG. 15.

FIGS. 15 and 16 illustrate the grip ring 250 according to another example aspect of the present disclosure. The grip ring 250 can be formed from a metal material, such as, for example, stainless steel, and may be formed from a high gauge stainless steel, as described above. Other aspects of the grip ring 250 can be formed from other metal materials, plastics, composites, or any other material known in the art having suitable strength for gripping pipes and tubing of varying materials. In the present aspect, the grip ring 250 can define the substantially C-shaped ring body 252, but does not define the plurality of teeth 254 (shown in FIG. 2) extending therefrom. The ring body 252 can define the grip ring first end 456 and the opposing grip ring second end 458, and the gap 459 can be defined therebetween. The ring body 252 can further define the ring body first lateral end 452 and the ring body second lateral end 454. The grip ring opening 462 can extend centrally through the grip ring 250 from the ring body first lateral end 452 to the ring body second lateral end 454. A grip ring axis 1560 can extend centrally through the grip ring opening 462, as shown. Additionally, in the present aspect, the ring body 252 can be angled radially inward from the ring body first lateral end 452 to the ring body second lateral end 454, relative to the grip ring axis 1560, such that a diameter of the grip ring 250 can taper from the ring body first lateral end 452 to the ring body second lateral end 454. Thus, the ring body 252 can be substantially frustoconical in shape.

An arcuate proximal edge 1562 can be defined at the ring body first lateral end 452 and can extend generally between the grip ring first and second ends 456,458, and an arcuate distal engagement edge 1564 can be defined at the ring body second lateral end 454 and can extend generally between the grip ring first and second ends 456,458. The distal engagement edge 1564 can be configured to bite or press into the outer surface 714 (shown in FIG. 18) of the pipe 710 (shown in FIG. 18), as described in further detail below. In some aspects, a first notch 1566a can extend into the distal engagement edge 1564 proximate to the grip ring first end 456, and a second notch 1566*b* can extend into the distal engagement edge 1564 proximate to the grip ring second end 458. In the present aspect, the first and second notches 1566*a,b* are not functional, but rather can serve as a visual indicator to distinguish the grip ring 250 from other grip rings, such as grip rings of a differing size, material, etc. Example aspects of the grip ring 250 can further define a first retainer tab 1568*a* extending from the grip ring first end 456 into the gap 459 at the ring body first lateral end 452, as shown. Similarly, the grip ring 250 can define a second retainer tab 1568*b* extending from the grip ring second end 458 into the gap 459 at the ring body first lateral end 452. In example aspects, each of the first and second retainer tabs 1568*a,b* can be partially defined by the arcuate proximal edge 1562. As shown, the first and second retainer tabs 1568*a,b* can extend generally towards one another, and in some aspects, the first and second retainer tabs 1568*a,b* can be angled radially outward from the frustoconical ring body 252, relative to the grip ring axis 1560, as best shown in FIG. 16. Each of the first and second retainer tabs 1568*a,b* can engage the guide ring 260 (shown in FIG. 17) to secure the grip ring 250 thereto, as described in further detail below.

Figure 17:
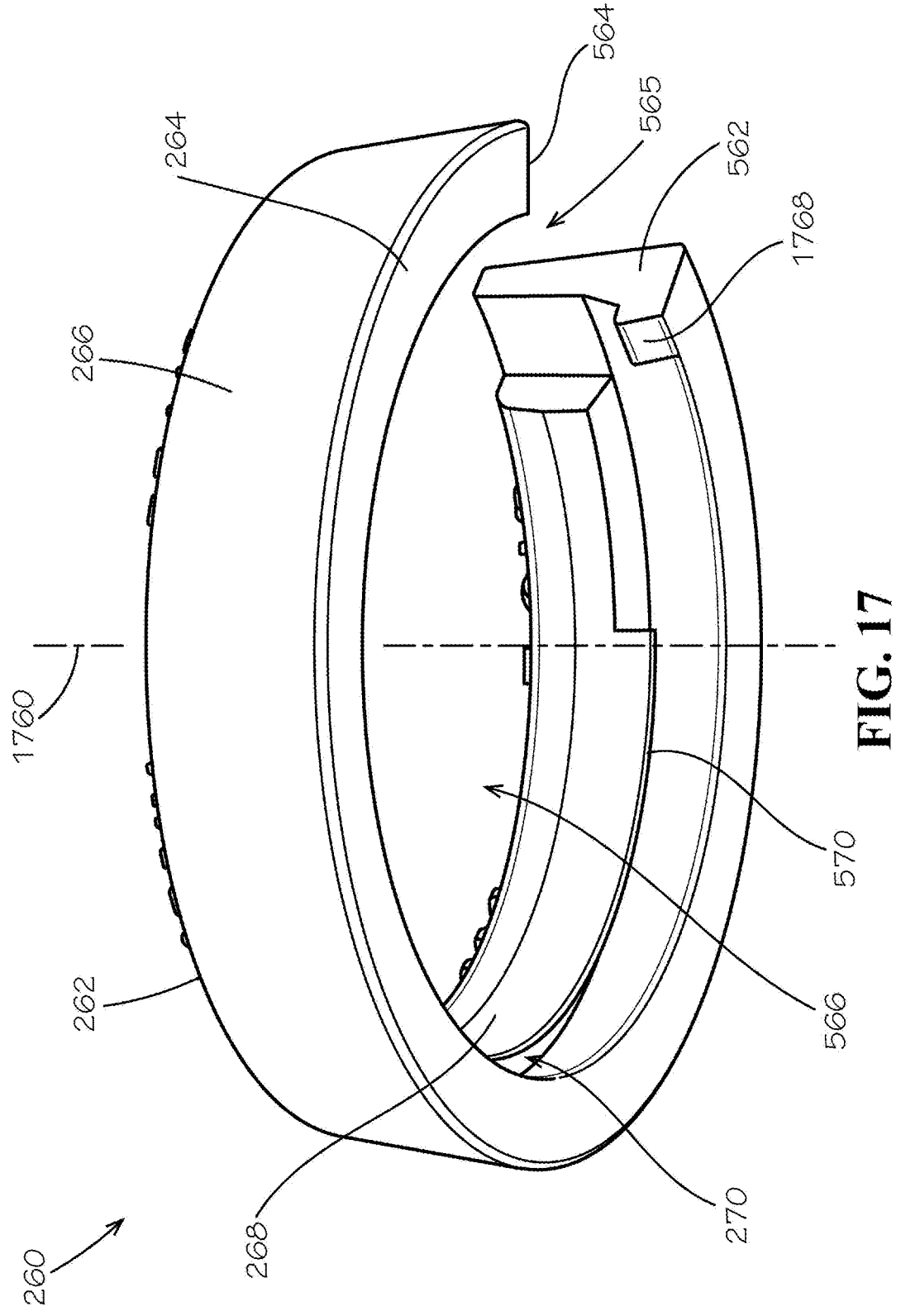
FIG. 17 is a rear perspective view of the guide ring in accordance with another aspect of the present disclosure.

FIG. 17 illustrates the guide ring 260 according to another example aspect of the present disclosure. Example aspects of the guide ring 260 can be formed from a plastic material. However, other aspects of the guide ring 260 can be formed from any other suitable material known in the art, such as metals, composites, and the like. The guide ring 260 of the present aspect can be substantially C-shaped and can define a guide ring first end 562, the guide ring second end 564, and the gap 565 formed therebetween. The guide ring 260 can further define the guide ring first lateral end 262, the guide ring second lateral end 264, the guide outer surface 266, and the guide inner surface 268. The guide inner surface 268 can define the guide ring opening 566, which can extend from the guide ring first lateral end 262 to the guide ring second lateral end 264. A guide ring axis 1760 an extend centrally through the guide ring opening 566. As described above, the pipe 710 (shown in FIG. 18) can extend through the guide ring opening 566, and the guide inner surface 268 can slide along the outer surface 714 (shown in FIG. 18) of the pipe 710.

Figure 18:
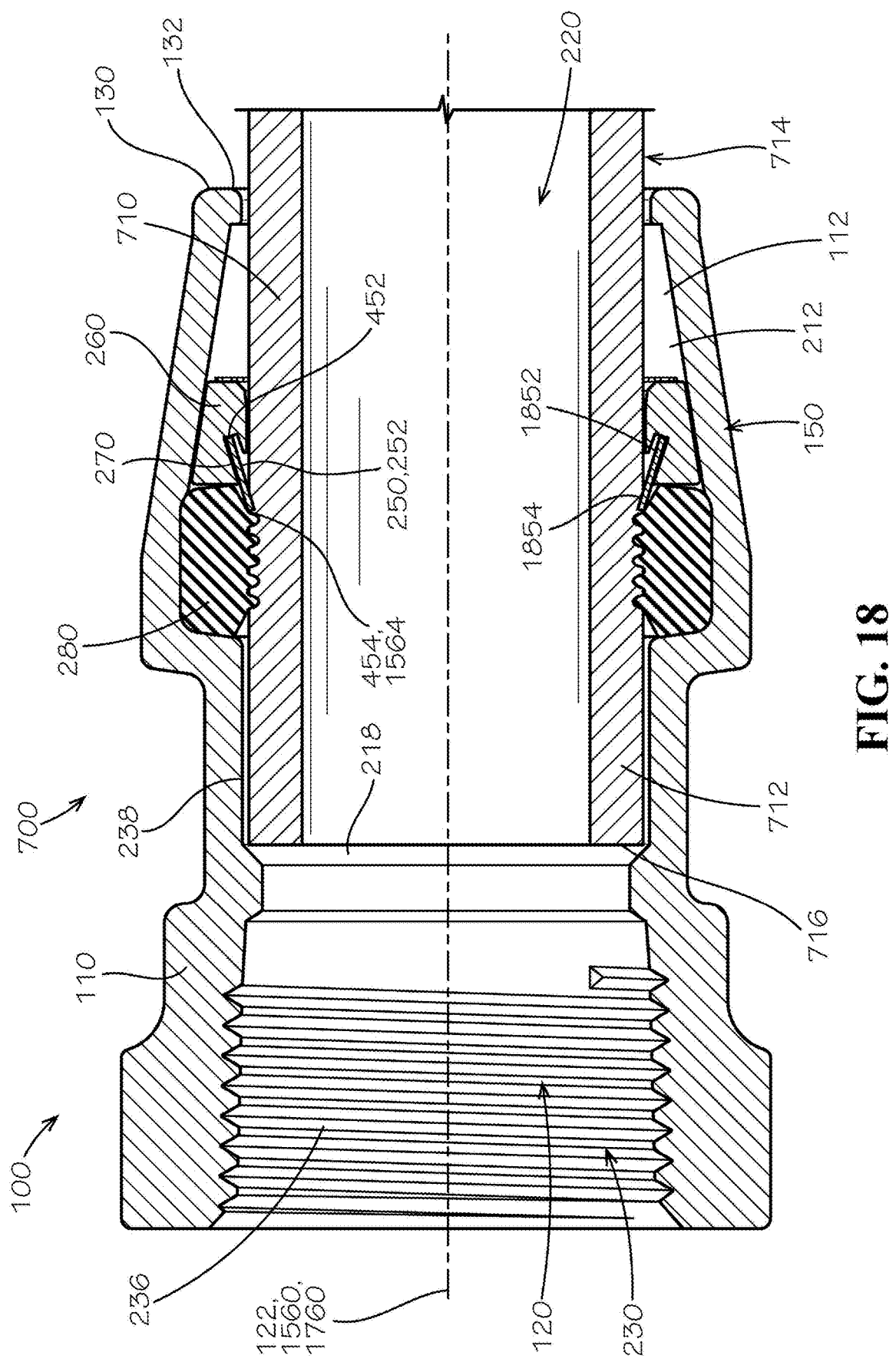
FIG. 18 is a cross-sectional view of the pipe engaged with the pipe fitting in accordance with another aspect of the present disclosure, the movable engagement assembly received within the pipe fitting and comprising the grip ring of FIG. 15 and the guide ring of FIG. 17.
Figure 19:
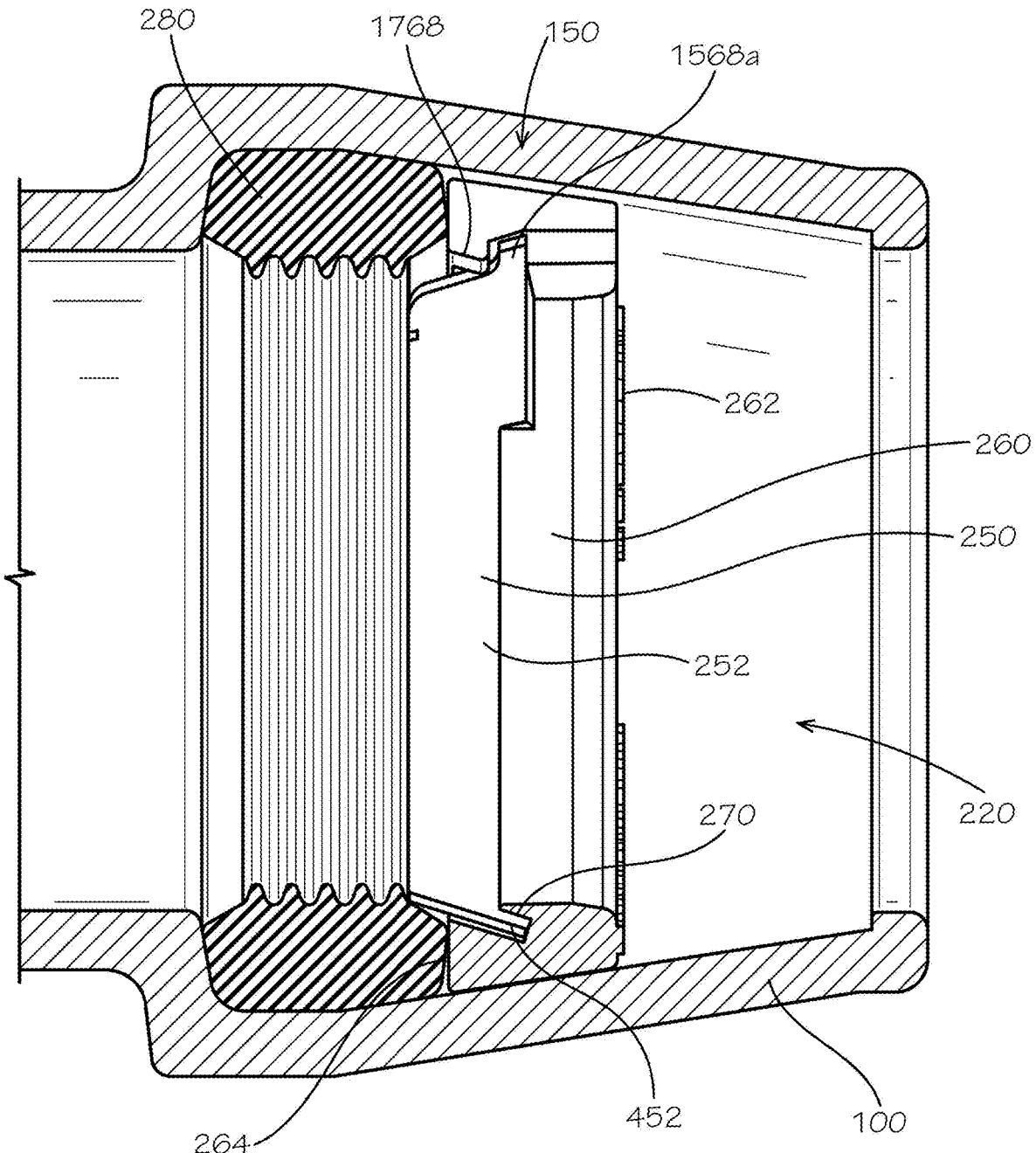
FIG. 19 is a detail cross-sectional view of the movable engagement assembly of FIG. 18 received within the pipe fitting of FIG. 18.

According to example aspects, the arcuate guide slot 270 can be defined between the guide outer surface 266 and the guide inner surface 268. The guide slot 270 can extend into the guide ring 260 generally in a direction from the guide ring second lateral end 264 towards the guide ring first lateral end 264. As described above, the guide slot 270 can be configured to receive the ring body first lateral end 452 (shown in FIG. 15) of the grip ring 250 (shown in FIG. 15). In the present aspect, the slot opening 570 of guide slot 270 can be axially offset from the guide ring second lateral end 264, such that the slot opening 570 can be defined between the guide ring first and second lateral ends 262,264. In some aspects, the arcuate guide slot 270 can be angled radially inward, relative to the guide ring axis 1760, in a direction generally towards the guide ring second lateral end 264 to substantially match the radially inward angle of the ring body 252, which is best shown in FIGS. 18 and 19. In example aspects of the guide ring 260, the guide inner surface 268 can define a retainer protrusion 1768 extending substantially radially inward at or adjacent to each of the guide ring first and second ends 562,564, proximate to the guide ring second lateral end 264. Each of the first and second retainer tabs 1568*a,b* (shown in FIG. 15) of the grip ring 250 can engage a corresponding one of the retainer protrusions 1768 to retain the grip ring 250 within the guide slot 270, thereby securing the grip ring 250 to the guide ring 260.

FIG. 18 illustrates the grip ring 250 and the guide ring 260, which together can define the engagement assembly 150, assembled within the first channel region 220 of the channel 120 of the pipe fitting 100. The grip ring axis 1560 and the guide ring axis 1760 can be substantially coaxial with the fitting axis 122. The gasket 280 can also assembled within the first channel region 220. The first end 712 of the pipe 710 can be inserted through the first fitting opening 132 of the fitting body 110 in the inward direction and received within the channel 120. The pipe fitting 100 and the pipe 710 can together define the pipe fitting assembly 700. The pipe 710 can extend through the first channel region 220 and into the second portion 238 of the second channel region 230. According to some example aspects, the peripheral edge 716 of the pipe 710 may be configured to abut the shoulder 218 to prohibit further advancement of the pipe 710 through the channel 120 and into the first portion 236 of the second channel region 230.

The first end 712 of the pipe 710 can be received through the guide ring opening 566 (shown in FIG. 17) of the guide ring 260, the grip ring opening 462 (shown in FIG. 15) of the grip ring 250, and the gasket opening 384 (shown in FIG. 3A) of the gasket 280. As described above, the ring body 252 of the grip ring 250 can be angled inward from the ring body first lateral end 452 to the ring body second lateral end 454. In some aspects, the ring body 252 can be angled radially inward at an angle of between about 5° and 45°. In some aspects, the ring body 252 can be angled radially inward at an angle of between about 15° and 20°. A first portion 1852 of the ring body 252 at the ring body first lateral end 452 can be received within the guide slot 270 of the guide ring 260, and a second portion 1854 of the ring body 252 at the second lateral end 454 can extend beyond and be disposed external to the guide slot 270. Similar to the distal engagement edges 466 (shown in FIG. 4) of the teeth 254 (shown in FIG. 2), the distal engagement edge 1564 formed at the ring body second lateral end 454 can engage the outer surface 714 of the pipe 710. As described above, the engagement assembly 150 can be slid towards the first fitting end 130 of the fitting body 110 to sandwich the engagement assembly 150 between the pipe 710 and the tapered region 212 of the fitting inner surface 112. Sandwiching the engagement assembly 150 between the pipe 710 and the tapered region 212 can increasingly press the distal engagement edge 1564 of the grip ring 250 into the outer surface 714 of the pipe 710, improving the grip of the grip ring 250 on the pipe 710 and retaining the pipe 710 within the channel 120 of the pipe fitting 100.

FIG. 19 illustrates a detail cross-sectional view of the first channel region 220, wherein the pipe 710 is removed for full visibility of the engagement assembly 150 and the gasket 280. As shown, when the grip ring 250 is assembled with the guide ring 260, the ring body first lateral end 452 can be received within the guide slot 270 of the guide ring 260, which can prohibit movement of the grip ring 250 towards the guide ring first lateral end 262. Furthermore, the retainer protrusions 1768 of the guide ring 260 can be disposed axially between the first and second retainer tabs 1568*a,b* (second retainer tab 1568*b* shown in FIG. 15) of the grip ring 250 and the guide ring second lateral end 264, and the first and second retainer tabs 1568*a,b* can catch on the corresponding retainer protrusions 1768 to prohibit movement of the grip ring 250 towards the guide ring second lateral end

264. The grip ring 250 can thereby be secured to the guide ring 260 and can be prevented from disengaging the guide slot 270.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A guide ring comprising:
   a guide ring body defining a guide outer surface, a guide inner surface opposite the guide outer surface, a first lateral end, a second lateral end opposite the first lateral end, a first circumferential end, and a second circumferential end opposite the first circumferential end, the guide inner surface defining a guide ring opening;
   a gap defined between the first circumferential end and the second circumferential end; and
   an arcuate guide slot extending laterally into the guide ring body and disposed radially between the guide outer surface and the guide inner surface and configured to receive a grip ring;
   wherein the guide ring body is configured to be compressed radially inward to reduce a width of the gap between the first circumferential end and the second circumferential end;
   wherein the guide outer surface is a tapered guide outer surface and extends from the first lateral end to the second lateral end;
   wherein a first retainer protrusion extends radially inward from a slot surface of the arcuate guide slot proximate to the first circumferential end, and wherein the first retainer protrusion is configured to engage the grip ring to retain the grip ring within the arcuate guide slot.

2. The guide ring of claim 1, wherein:
   the first retainer protrusion is formed adjacent to the second lateral end; and
   the arcuate guide slot extends laterally into the guide ring body at the second lateral end.

3. The guide ring of claim 1, wherein:
   a second retainer protrusion extends radially inward from the slot surface of the arcuate guide slot proximate to the second circumferential end; and
   the second retainer protrusion is formed adjacent to the second lateral end.

4. The guide ring of claim 1, wherein the guide ring body defines a slot opening allowing lateral access to the arcuate guide slot, and wherein the slot opening is offset from the first lateral end such that the slot opening is arranged laterally between the first lateral end and the second lateral end.

5. The guide ring of claim 1, wherein the arcuate guide slot is angled radially inward in a direction towards the first lateral end.

6. The guide ring of claim 5, wherein
   an angle of the arcuate guide slot substantially matches an angle of the grip ring.

* * * * *